US011984794B2

(12) United States Patent
LaForce et al.

(10) Patent No.: US 11,984,794 B2
(45) Date of Patent: May 14, 2024

(54) COOLING AND LUBRICATION SYSTEM FOR AN ELECTRIC MOTOR AND GEARBOX ASSEMBLY

(71) Applicant: Dana Heavy Vehicle Systems Group, LLC, Maumee, OH (US)

(72) Inventors: Nicholas W. LaForce, Whitehouse, OH (US); Maxime Veillette, Saint-Constant (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 174 days.

(21) Appl. No.: 17/450,434

(22) Filed: Oct. 8, 2021

(65) Prior Publication Data
US 2023/0110432 A1 Apr. 13, 2023

(51) Int. Cl.
*H02K 9/193* (2006.01)
*B60K 1/00* (2006.01)
*F16H 57/02* (2012.01)
*F16H 57/029* (2012.01)
*F16H 57/04* (2010.01)
*H02K 5/20* (2006.01)
*H02K 7/00* (2006.01)
*H02K 7/116* (2006.01)

(52) U.S. Cl.
CPC ............ *H02K 9/193* (2013.01); *B60K 1/00* (2013.01); *F16H 57/029* (2013.01); *F16H 57/043* (2013.01); *F16H 57/0471* (2013.01); *H02K 5/203* (2021.01); *H02K 7/006* (2013.01); *H02K 7/116* (2013.01); *B60K 2001/001* (2013.01); *F16H 2057/02034* (2013.01); *F16H 2057/02052* (2013.01)

(58) Field of Classification Search
CPC ........ H02K 9/193; H02K 5/203; H02K 7/006; H02K 7/116; B60K 1/00; B60K 2001/001; F16H 57/029; F16H 57/043; F16H 57/0471; F16H 2057/02034; F16H 2057/02052; F16H 57/0476; F16H 57/048
USPC ........................................................ 310/54
See application file for complete search history.

(56) References Cited

U.S. PATENT DOCUMENTS

| 3,785,458 | A | 1/1974 | Caldwell et al. |
| 4,081,218 | A | 3/1978 | Gabriel |
| 5,382,858 | A | 1/1995 | Sugiyama |
| 5,687,612 | A | 11/1997 | Imamura |
| 5,718,300 | A | 2/1998 | Frost |
| 5,802,398 | A | 9/1998 | Liu et al. |
| 6,561,321 | B1 | 5/2003 | Klode et al. |
| 6,752,472 | B2 | 6/2004 | Bezzina |

(Continued)

FOREIGN PATENT DOCUMENTS

| CN | 103921674 A | 7/2014 |
| DE | 102009018122 A1 | 10/2010 |

(Continued)

*Primary Examiner* — John K Kim
(74) *Attorney, Agent, or Firm* — McCoy Russell LLP

(57) ABSTRACT

A system for cooling and lubricating a rotor shaft bearing of an electric machine is provided. In one example, the system includes a plurality of oil passages that extend axially through a rotor shaft and open into a sealed cavity near a housing interface between an electric machine housing and gearbox housing to route oil to the rotor shaft bearing for cooling and lubrication thereof.

15 Claims, 12 Drawing Sheets

(56) References Cited

U.S. PATENT DOCUMENTS

| | | |
|---|---|---|
| 6,805,212 B2 | 10/2004 | Thomas |
| 6,983,668 B2 | 1/2006 | Powell et al. |
| 7,325,664 B2 | 2/2008 | Fusegi |
| 7,682,279 B2 | 3/2010 | Donofrio et al. |
| 7,699,751 B2 | 4/2010 | Barber et al. |
| 7,965,002 B2 * | 6/2011 | Savant .................. H02K 5/06 |
| | | 310/58 |
| 8,050,829 B2 | 11/2011 | Johnson et al. |
| 8,053,691 B2 | 11/2011 | Vernacchia et al. |
| 8,161,837 B2 | 4/2012 | Giefer et al. |
| 8,205,719 B2 | 6/2012 | Sora |
| 8,459,433 B2 | 6/2013 | Völz et al. |
| 8,523,726 B2 | 9/2013 | Giessner |
| 8,770,057 B2 | 7/2014 | Ruhl |
| 8,840,506 B2 | 9/2014 | Schwekutsch et al. |
| 8,928,195 B2 * | 1/2015 | Ohashi .................. H02K 9/19 |
| | | 310/58 |
| 9,098,080 B2 | 8/2015 | Norris et al. |
| 9,109,634 B2 | 8/2015 | Trönnberg |
| 9,132,811 B2 | 9/2015 | Dufford et al. |
| 9,193,336 B2 | 11/2015 | Frait |
| 9,238,452 B2 | 1/2016 | Hyde et al. |
| 9,353,859 B2 | 5/2016 | Larsson et al. |
| 9,657,828 B2 | 5/2017 | Larsson |
| 10,336,335 B2 | 7/2019 | Malone et al. |
| 10,876,628 B2 | 12/2020 | Gruber et al. |
| 2004/0214680 A1 | 10/2004 | Schoon |
| 2009/0102298 A1 * | 4/2009 | Savant .................. H02K 5/203 |
| | | 310/52 |
| 2010/0121547 A1 | 5/2010 | Demmer |
| 2010/0156221 A1 * | 6/2010 | Dooley .................. H02K 7/116 |
| | | 310/83 |
| 2010/0288598 A1 | 11/2010 | Geifer et al. |
| 2011/0202246 A1 | 8/2011 | Lindsay et al. |
| 2012/0025645 A1 * | 2/2012 | Chan .................. F02N 15/006 |
| | | 310/83 |
| 2016/0164377 A1 * | 6/2016 | Gauthier .................. H02K 1/32 |
| | | 310/54 |
| 2016/0164378 A1 * | 6/2016 | Gauthier .................. H02K 9/19 |
| | | 310/54 |
| 2017/0137119 A1 * | 5/2017 | Didey .................. F16H 57/042 |
| 2020/0039343 A1 * | 2/2020 | Taikou .................. B60K 17/08 |
| 2021/0116026 A1 | 4/2021 | Weinl et al. |
| 2022/0196135 A1 * | 6/2022 | Tamura .................. F16H 57/021 |
| 2023/0110432 A1 * | 4/2023 | Laforce .................. H02K 7/116 |
| | | 310/54 |

FOREIGN PATENT DOCUMENTS

| | | |
|---|---|---|
| EP | 1679456 A1 | 7/2006 |
| JP | 2011511218 A | 4/2011 |
| WO | 2006058571 A1 | 6/2006 |
| WO | 2010048947 A1 | 5/2010 |

\* cited by examiner

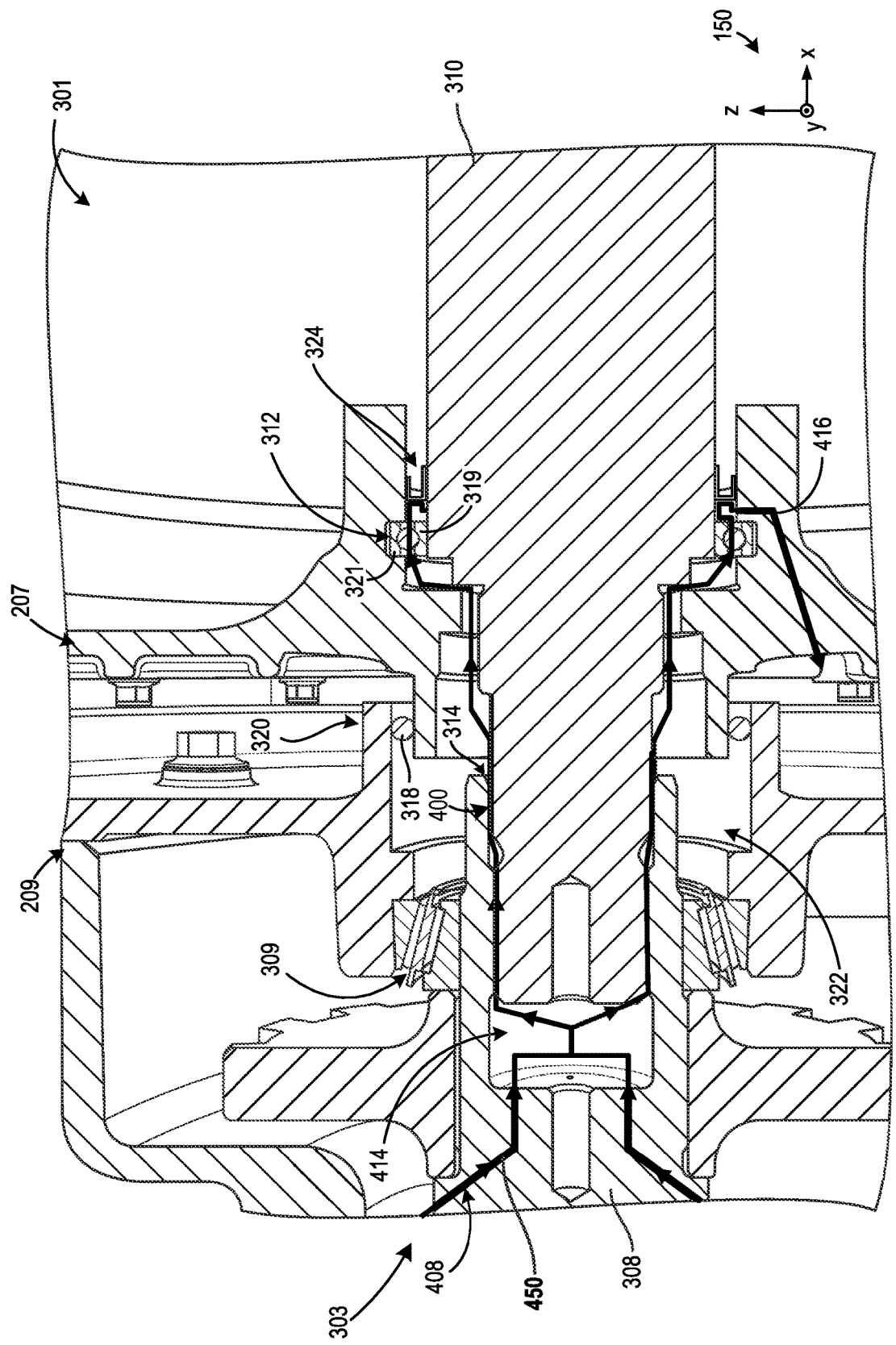

COOLING AND LUBRICATION SYSTEM FOR AN ELECTRIC MOTOR AND GEARBOX ASSEMBLY

TECHNICAL FIELD

The present description relates generally to a cooling and lubrication system for an electric motor and gearbox in an electric vehicle (EV).

BACKGROUND AND SUMMARY

Previous electric drive systems have included moving components such as bearings, gears, and the like, that can generate friction and heat during operation. In order to lubricate and cool these components, cooling and lubrication assemblies have been integrated within the electric drive systems to direct oil to the components. For instance, in some systems, oil circuits have been employed for routing oil to gearbox components, and separate coolant circuits are used to remove heat from electric motor components.

In certain electric drive systems, a front bearing of an electric motor may be subject to a high thermal gradient thereacross, due to thermal inputs at the inner race from the gearbox and cooling of its outer race via the motor cooling circuit. This may cause internal clearances within the bearing to shrink or may create interferences. The longevity of the bearing and, more generally, the longevity of the entire system may be consequently decreased, in some cases. However, if additional clearance is provided in the bearing, the resultant misalignment may lead to increased noise, vibration, and harshness (NVH) in the system.

U.S. Pat. No. 8,523,726 B2 from Giessner teaches a hybrid transmission including an electric machine with a rotor coupled to a transmission input shaft. This hybrid transmission further includes an arrangement which attempts to lubricate and cool radial bearings using transmission oil. Giessner employs several radial shaft seals and O-ring seals to prevent oil from leaking from the transmission by way of the bearings and for directing oil towards the bearings.

The inventors have recognized several drawbacks with Giessner's lubrication and cooling arrangement and other lubrication and cooling arrangements. For instance, Giessner's seal arrangement which attempts to maintain oil in the gearbox housing may excessively restrict oil flow, which may prevent contaminants from being adequately flushed from the bearing, thus decreasing its lifespan. Further, Giessner does not provide a cooling circuit for the electric machine. Therefore, the inventors have recognized an unmet need for a system that efficiently cools and lubricates motor bearings, as well as other components within an electric drive system.

To resolve at least a portion of the aforementioned issues, the inventors have developed an electric drive system. In one example, the electric drive system includes an electric machine with a housing connected to a gearbox housing, and a rotor shaft which forms a shaft interface with a gearbox shaft at an outboard end of the rotor shaft. The system further includes a rotor shaft bearing on the rotor shaft at a location within the electric machine housing inboard of the shaft interface. The system further includes a rotor shaft seal disposed within the electric machine housing on an inboard side of the rotor shaft bearing. The system even further includes multiple oil passages that are in fluidic communication with an oil reservoir, extend through the rotor shaft, and are in fluidic communication with the rotor shaft bearing. By routing oil through the rotor shaft to the rotor shaft bearing, the system efficiently utilizes gearbox lubricating oil to cool and lubricate the rotor shaft bearing to reduce bearing wear and increase its longevity. Additionally, by routing oil to the bearing in the aforementioned manner, the thermal gradient across the bearing is reduced. Further, the inclusion of oil passages through the shaft interface allows additional shafts seals in the system which hold grease at the interface to be omitted from the system, if wanted.

In another example, the system may include a housing seal disposed between the gearbox housing and the electric machine housing at a housing interface. In such an example, a cavity is formed radially inward from the housing interface. In some examples, the housing interface is positioned axially between the shaft interface and the rotor shaft bearing. In this way, the housing seal and the rotor shaft seal permit oil flow through the cavity while reducing the chance of unwanted oil leakage from the gearbox housing or ingress into the electric machine housing. The sealed cavity further allows the oil to be directed through the rotor shaft bearing to flush contaminants therefrom. The bearing's longevity is consequently increased.

In yet another example, the electric machine housing includes a water jacket through which coolant circulates. Such a configuration provides effective cooling of the electric machine that is fluidly separate from the gearbox's oil circuit.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 4A-4F show a detailed view of the electric drive cross-section shown in FIG. 3, with FIGS. 4B-4F illustrating various examples of oil flow paths which may be formed therein.

DETAILED DESCRIPTION

The following description relates to systems for cooling and lubricating components of an electric drive system, particularly a front rotor shaft bearing. The electric drive system may include an electric machine (e.g., an electric motor) with a housing coupled to a gearbox housing at a housing interface. The system may further include a rotor shaft of the electric machine and a gearbox shaft that form a splined shaft interface which is located near the housing interface. A rotor shaft bearing may be disposed in the electric machine housing on the rotor shaft at a location between the splined shaft interface and a rotor shaft seal disposed on the rotor shaft within the electric machine housing. Further, a housing seal (e.g., an O-ring seal) may be positioned at a portion of the housing interface, which may define a sealed cavity positioned radially inward from the housing interface between the shaft interface and the rotor shaft seal. Even further, the splined shaft interface may include multiple oil passages that route oil through the splined shaft interface into the sealed cavity and to the rotor shaft bearing. Consequently, oil within the gearbox may be efficiently directed through the oil passages in the shaft interface, the sealed cavity, and the rotor shaft bearing and then return to an oil reservoir. In this way, the rotor shaft bearing may be reliably cooled and lubricated via a space efficient assembly to overcome negative effects caused by a high thermal gradient across the rotor shaft bearing.

Figure 1:
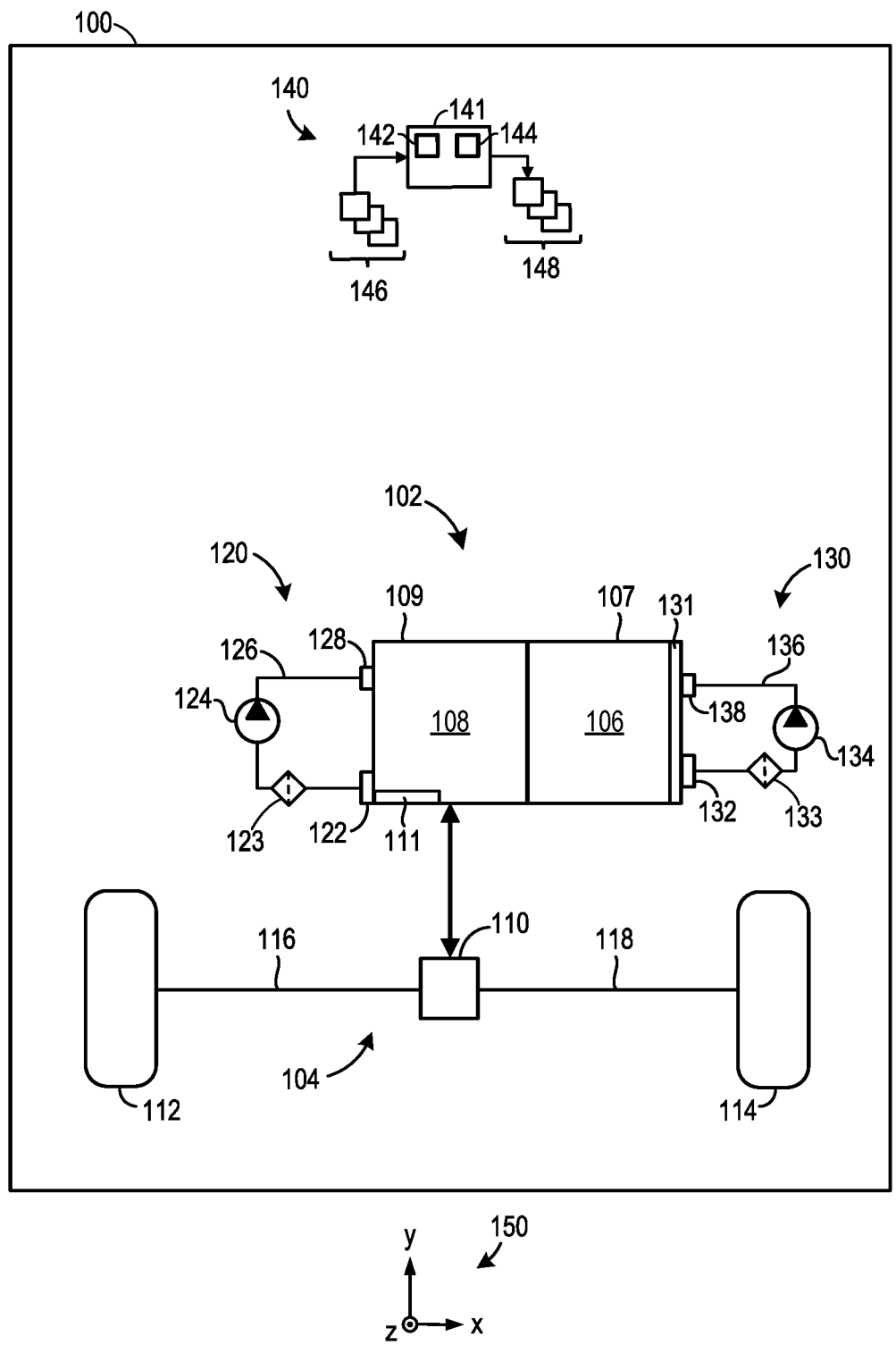
FIG. 1 shows a schematic representation of an electric drive system with lubrication and cooling assemblies.
Figure 2:
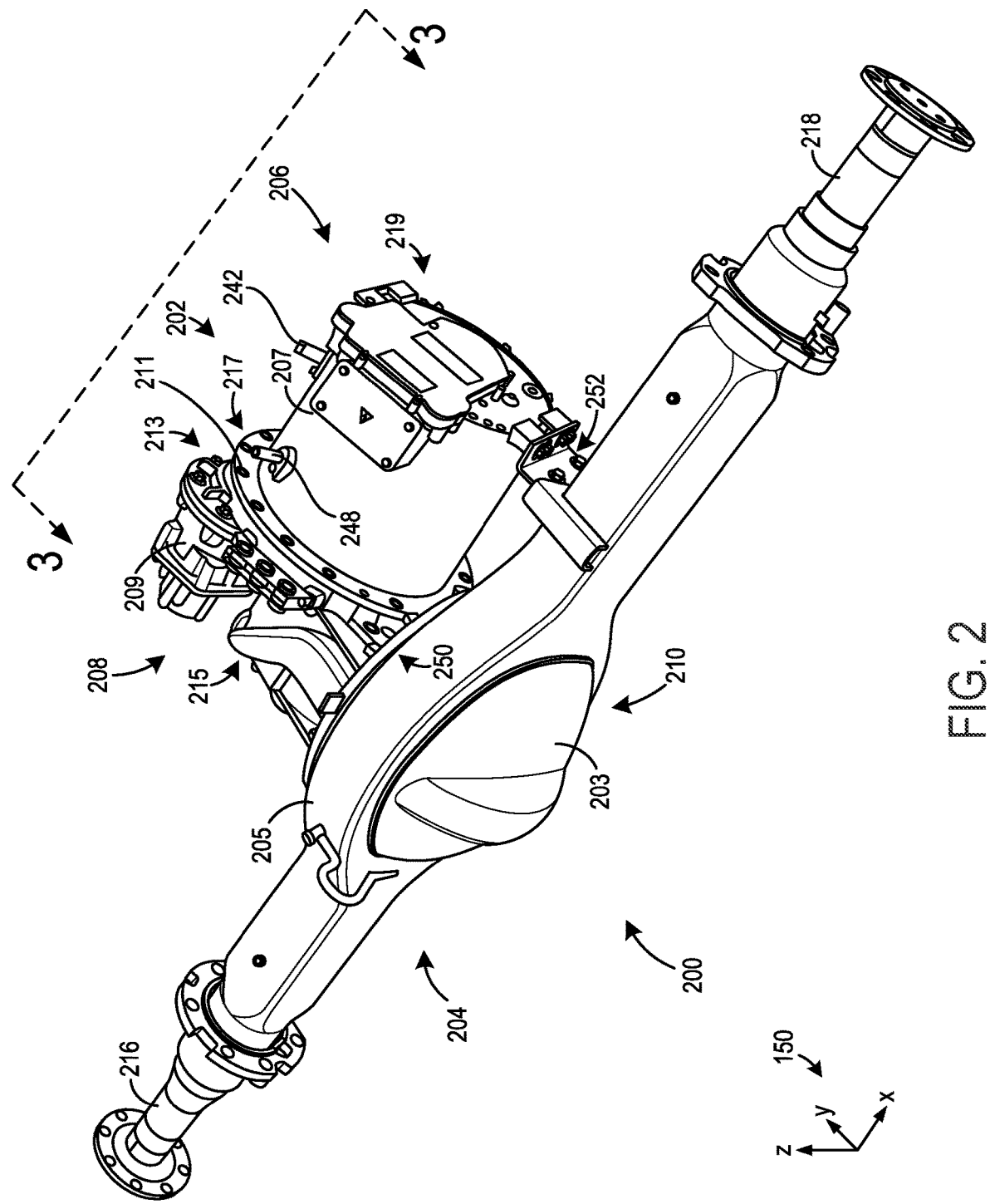
FIG. 2 shows a perspective view of an electric drive system, according to one example.
Figure 3:
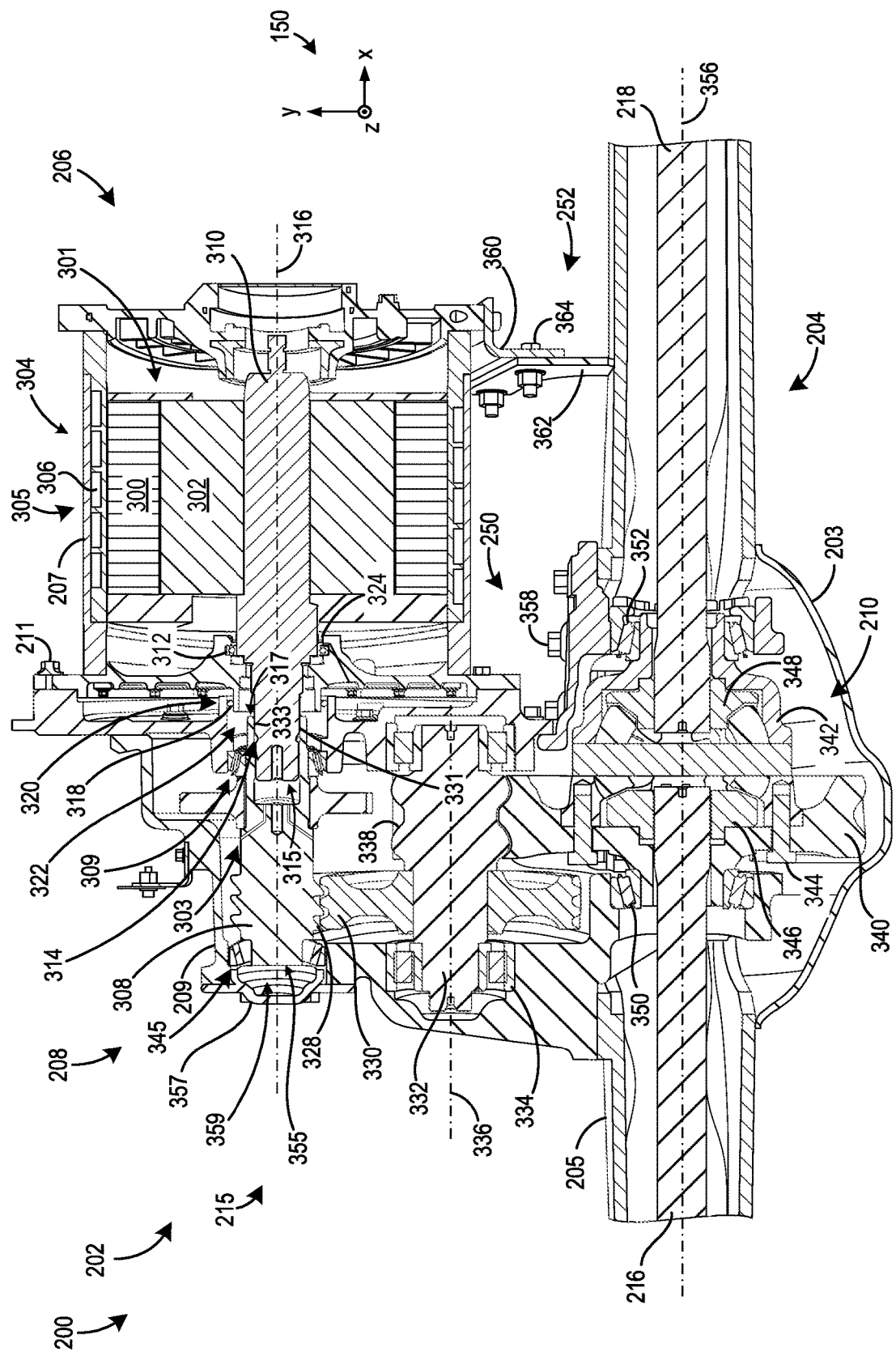
FIG. 3 shows a cross-sectional view of a portion of the electric drive system depicted in FIG. 2.
Figure 4A:
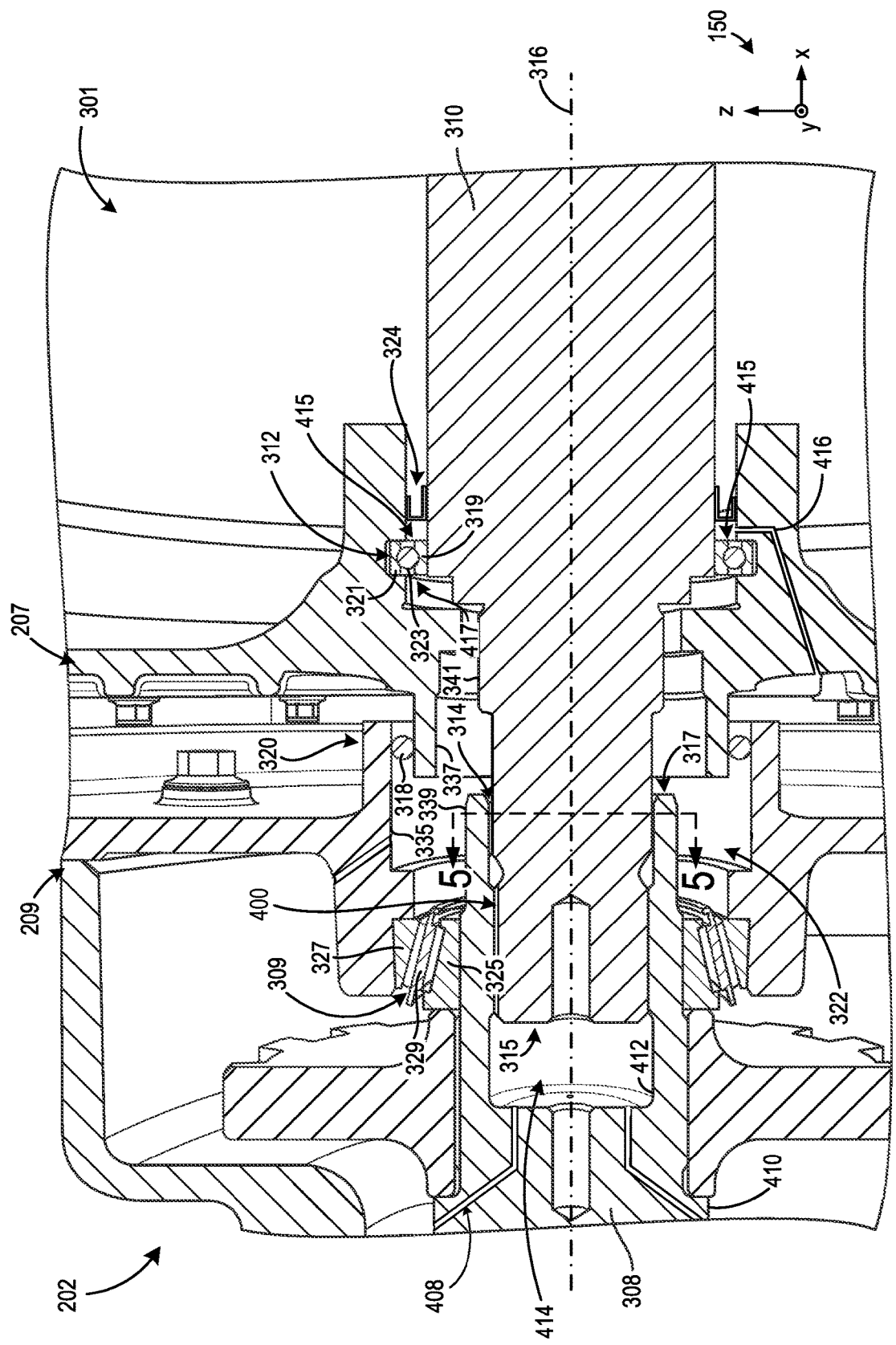
Figure 5:
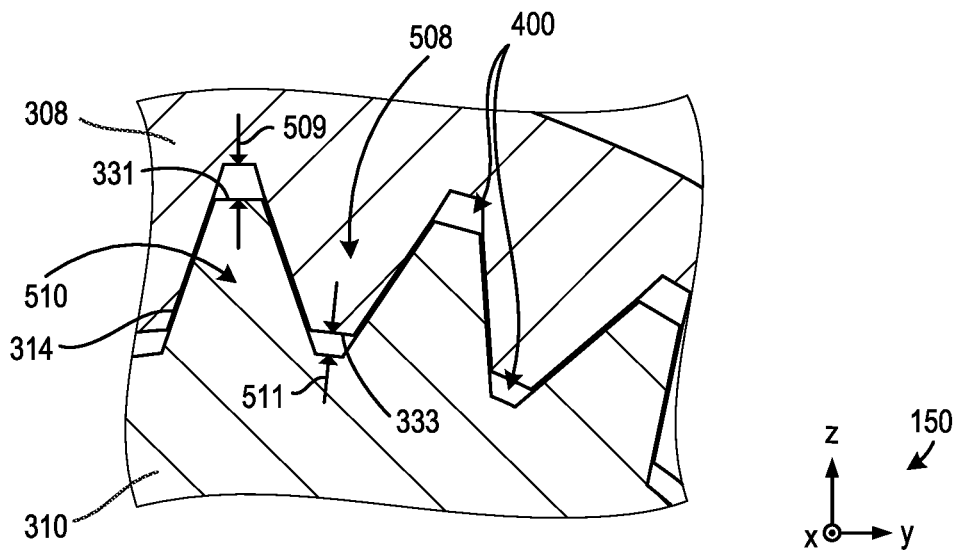
FIG. 5 shows an axial cross-section of a portion of a splined shaft interface between a rotor shaft and a gearbox shaft in a gearbox, particularly illustrating oil passages formed therein.
Figure 6:
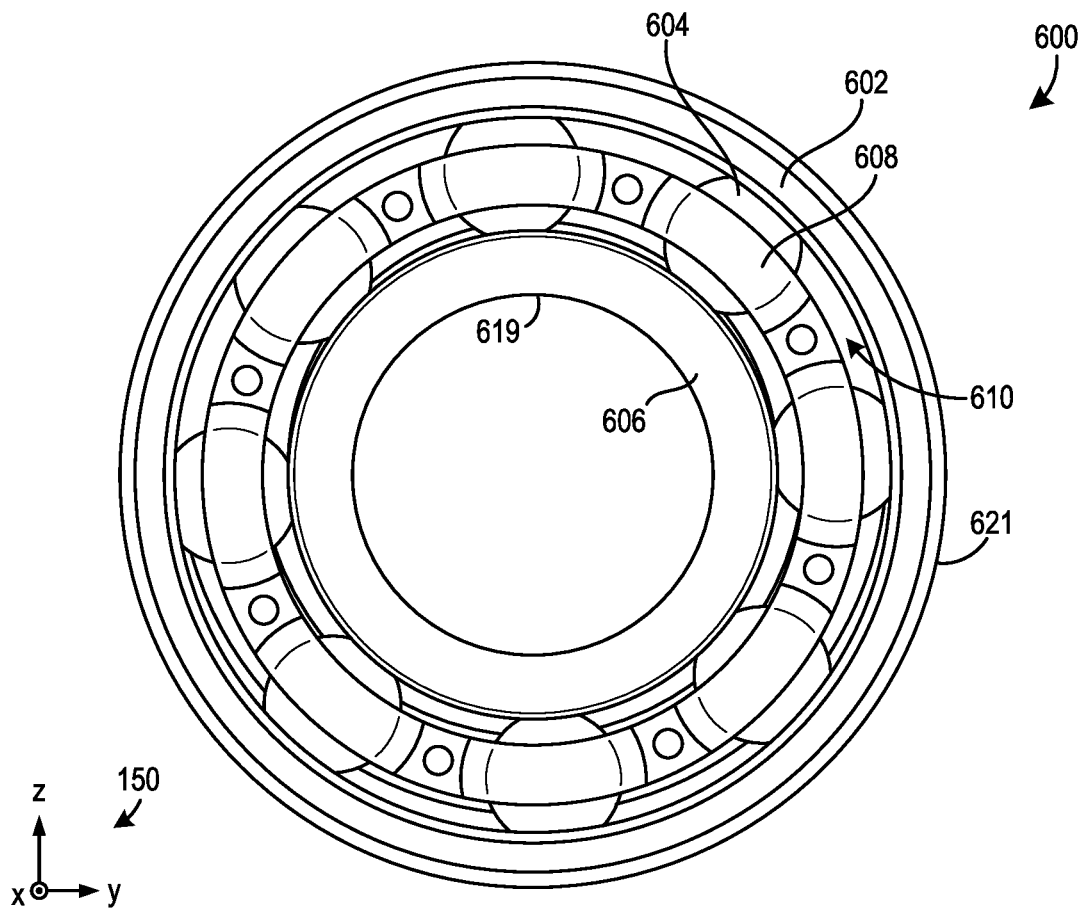
FIG. 6 shows an axial view of an exemplary rotor shaft bearing included in the electric drive system.
Figure 7A:
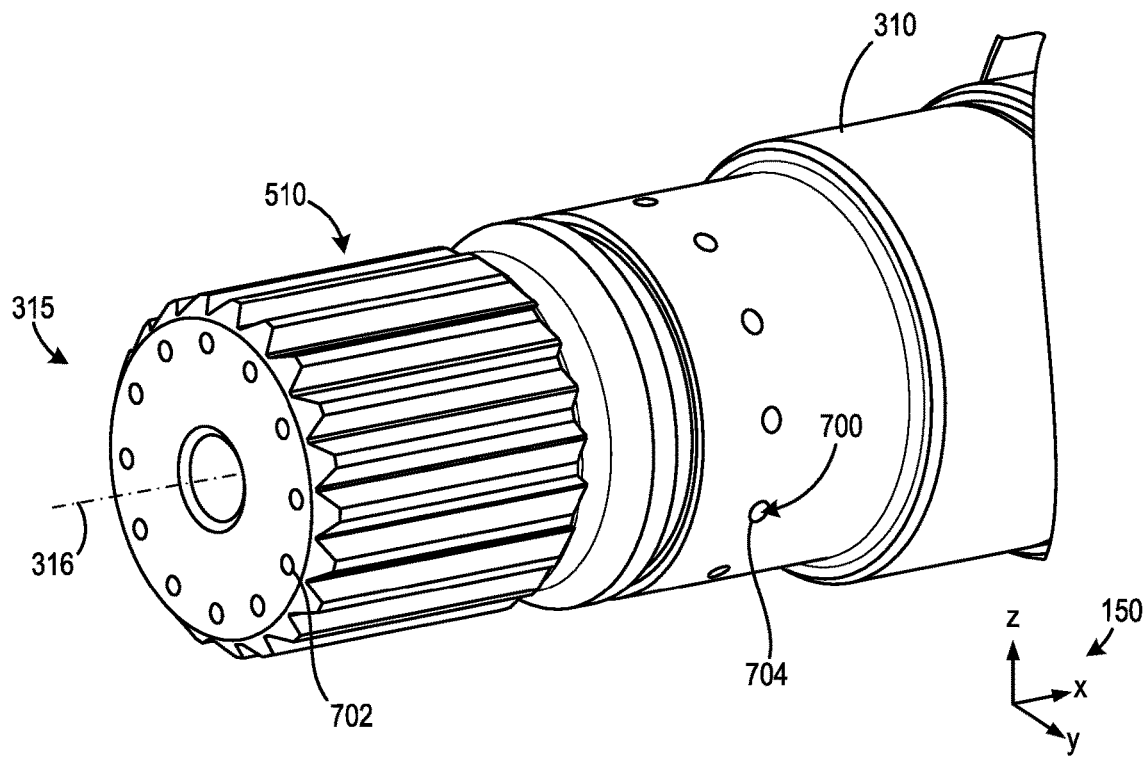
FIGS. 7A-7B depict one example of a rotor shaft having oil passages formed therein.
Figure 7B:
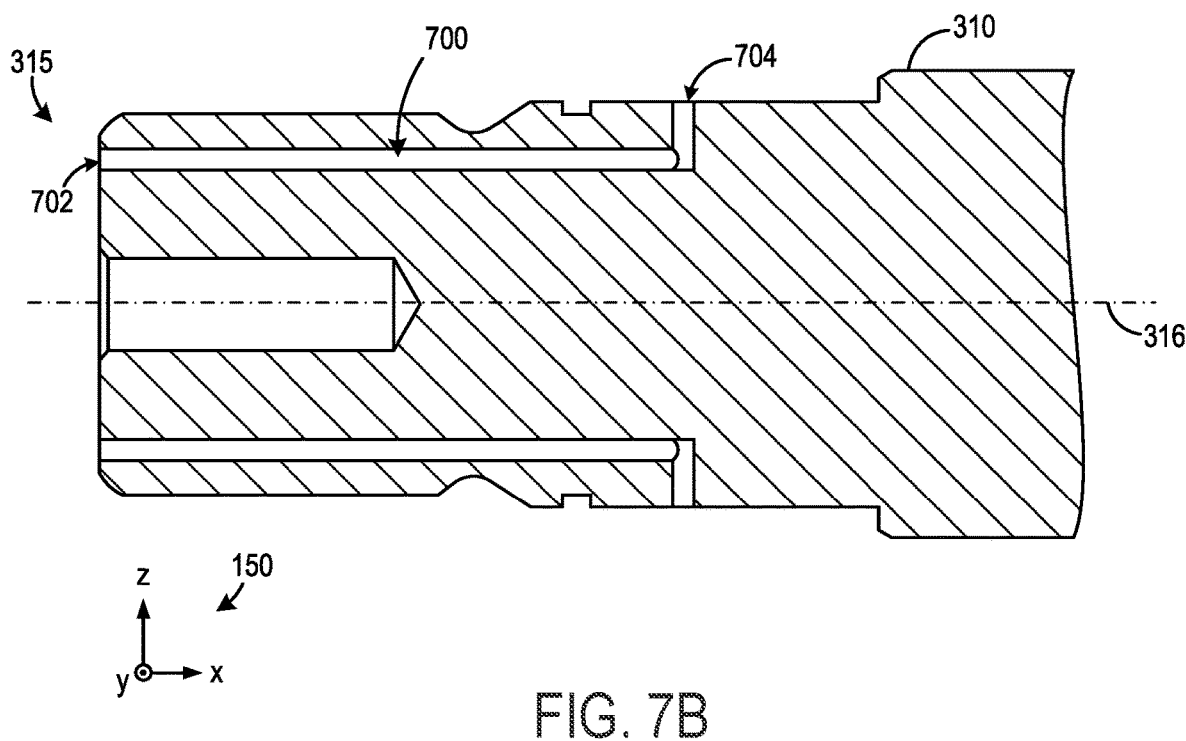
Figure 8:
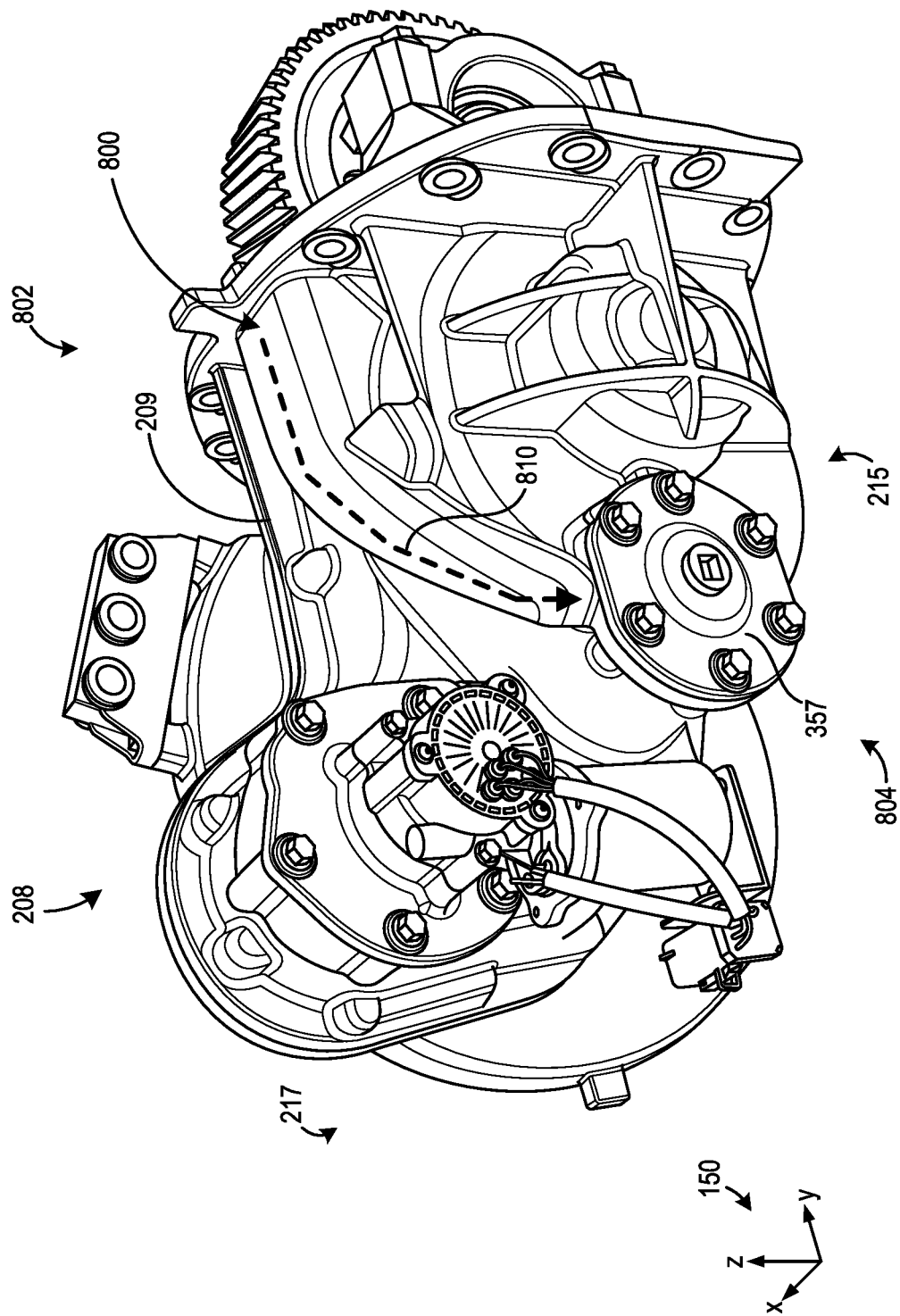
FIG. 8 illustrates a perspective view of a gearbox of the electric drive system.

FIG. 1 schematically depicts an electric drive system in a vehicle with an oil circuit and a coolant circuit for cooling and lubrication of components in the system. FIG. 2 shows an electric drive system with an electric machine and a gearbox. FIG. 3 shows the interior of the electric drive system of FIG. 2. FIGS. 4A-4F illustrate a portion of the view shown in FIG. 3, particularly showing exemplary oil passages of an oil circuit, with FIGS. 4B-4F showing potential oil flow paths defined within the electric drive system. FIG. 5 illustrates an exemplary configuration of a shaft interface formed between a rotor shaft and a gearbox shaft which have oil passages formed therein. FIG. 6 shows an exemplary rotor shaft bearing in the electric machine. FIGS. 7A-7B illustrates an alternate example of a rotor shaft having oil passages formed therein. FIG. 8 shows a perspective view of the gearbox, particularly illustrating a region of the gearbox housing for routing oil to various components in the electric drive system.

FIGS. 2-8 are drawn approximately to scale. However, other relative component dimensions may be used, in other embodiments.

FIG. 1 schematically illustrates an electric vehicle 100 with an electric drive system 102 that provides power to and/or is incorporated into an axle assembly 104 vehicle 100. The vehicle 100 may take a variety of forms in different examples, such as a light, medium, or heavy duty vehicle. Additionally, the electric drive system 102 may be adapted for use in front and/or rear axles, as well as steerable and non-steerable axles. To generate power, the electric drive system 102 may include an electric machine 106. In some examples, the electric machine 106 may be an electric motor-generator and may thus include conventional components such as a rotor, a stator, and the like housed within an electric machine housing 107 for generating mechanical power as well as electric power during a regenerative mode, in some cases. Further, in other examples, the vehicle 100 may include an additional motive power source, such as an internal combustion engine (ICE) (e.g., a spark and/or compression ignition engine), for providing power to another axle. As such, the electric drive system 102 may be utilized in an electric vehicle (EV), such as a hybrid electric vehicle (HEV) or a battery electric vehicle (BEV).

In some examples, the electric machine housing 107 may be coupled (e.g., via bolts) to a housing 109 of a gearbox 108. Further, the electric machine 106 may provide mechanical power to a differential 110 via the gearbox 108. From the differential 110, mechanical power may be transferred to drive wheels 112, 114 by way of axle shafts 116, 118, respectively, of the axle assembly 104. As such, the differential 110 may distribute torque, received from the electric machine 106 via the gearbox 108, to the drive wheels 112, 114 of the axle shafts 116, 118, respectively, during certain operating conditions. In some examples, the differential 110 may be a locking differential, an electronically controlled limited slip differential, or a torque vectoring differential.

The gearbox 108 may be a single-speed gearbox, where the gearbox operates in one gear ratio. However, other gearbox arrangements have been envisioned such as a multi-speed gearbox that is designed to operate in multiple distinct gear ratios. Further, in one example, the electric machine 106, the gearbox 108, and the differential 110 may be incorporated into the axle 104, forming an electric axle (e-axle) in the vehicle 100. The e-axle, among other functions, for provides motive power to the wheels 112, 114 during operation. Specifically, in the e-axle embodiment, the electric machine and gearbox assembly may be coupled to and/or otherwise supported by an axle housing. In one particular example, the e-axle may be an electric beam axle where a solid piece of material (e.g., a beam, a shaft, and/or a housing extend(s) between the drive wheels). The e-axle may provide a compact arrangement for delivering power directly to the axle. In other examples, however, the electric machine 106 and the gearbox 108 may be included in an electric transmission in which the gearbox and/or electric motor are spaced away from the axle. For instance, in the electric transmission example, mechanical components such as a driveshaft, joints (e.g., universal joints), and the like may provide a rotational connection between the electric transmission and the drive axle.

The electric drive system 102 may further include an oil circuit 120 for circulating oil (e.g., natural and/or synthetic oil) through the gearbox housing 109 to lubricate and/or cool various system components. The oil circuit 120 may include a filter 123 and an oil pump 124 that draws oil from an oil reservoir 111 (e.g., a sump) in the gearbox housing 109, via an outlet 122, and drives a pressurized oil flow through a delivery line 126 to an inlet 128 of the gearbox housing 109. In some examples, the oil pump 124 may be provided at an exterior portion of the gearbox housing 109. However, in other examples, the oil pump may be included within the housing 109. Various distribution components and arrangements (e.g., nozzles, valves, jets, oil passages, and the like) of the oil circuit 120 may be included within the electric drive system 102 in order to facilitate routing of the oil within the gearbox housing 109 and, in one particular example, to a portion of the electric machine housing 107. In some case, the oil circuit 120 may be used for routing oil to various gearbox shafts and gears as well as a rotor shaft bearing of the electric machine, thereby providing an efficient system for effectively using the gearbox oil to cool said bearing. Exemplary oil passages, and the flow of oil therethrough for lubricating and cooling particular components, are expanded upon herein with reference to FIGS. 3-5.

The electric drive system 102 may further include a coolant circuit 130 that circulates coolant (e.g., water and/or glycol) through a water jacket 131 formed in the electric machine housing 107. The coolant circuit 130 may include a coolant inlet 138 and a coolant outlet 132 positioned on (or in) the electric machine housing 107. The coolant circuit 130 may further include a filter 133 and a pump 134 that circulates coolant from the coolant outlet 132 to the coolant inlet 138 via a coolant delivery line 136. From the coolant inlet 138, the coolant travels into the water jacket 131 formed in the electric machine housing 107 which removes heat from components of the electric machine 106. In some examples, the coolant circuit 130 may further include a heat exchanger (e.g., radiator) which removes heat from the coolant that exits the electric machine housing 107 by way of the coolant outlet 132.

The vehicle 100 may also include a control system 140 with a controller 141. The controller 141 may include a processor 142 and a memory 144. The memory may hold instructions stored therein that when executed by the processor cause the controller 141 to perform various methods, control techniques, and the like described herein. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle 100 and electric drive system 102. The controller 141 may also send control signals to various actuators 148 coupled at different locations in the vehicle 100 and electric drive system 102. For instance, the controller 141 may send command signals to the oil pump 124 and/or the pump 134 and, in response, the actuator(s) in the pump(s) may be adjusted to alter the flowrate of the oil and/or coolant delivered therefrom. In other examples, the controller may send control signals to the electric machine 106 and, responsive to receiving the command signals, the electric machine may be adjusted to alter a rotor speed. The other controllable components in the system may be operated in a similar manner with regard to sensor signals and actuator adjustment.

An axis system 150 is provided in FIG. 1, as well as FIGS. 2-8, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 depicts an example electric drive system 200 with an electric drive system 202 for providing power to an axle assembly 204. The electric drive system 200 may include an electric machine 206 operatively coupled to a gearbox 208 and may be included in a vehicle, such as the vehicle 100 depicted in FIG. 1, and may thus share similarities with the electric drive system 102. For instance, at least a portion of the components discussed with regard to the drive system 102, shown in FIG. 1, may be included in the electric drive system 202, shown in FIG. 2, or vice versa.

The electric machine 206 may include a housing 207 coupled to a housing 209 of the gearbox 208. In some cases, the electric machine housing 207 may be coupled to the gearbox housing 209 via fasteners, such as bolts 211, for instance. To elaborate, the gearbox housing 209 may have an inboard side 213, opposite an outboard side 215 thereof, coupled to an outboard side 217 of the electric machine housing 207, as illustrated in FIG. 2. Further, the electric machine housing 207 may include a coolant outlet 242 and a coolant inlet 248 of a coolant circuit (e.g., the coolant circuit 130 of FIG. 1) for moving coolant through a water jacket formed in the housing 207.

The electric machine 206 may provide power to a differential 210 via the gearbox 208 to provide rotational power to axle shafts 216, 218 (to which drive wheels may be coupled) of the axle assembly 204. In one example, the differential 210 and the axle shafts 216, 218 may be at least partially enclosed within an axle housing 205. In some examples, the axle housing 205 may include a differential cover 203 attachable thereto, near the differential, which may allow for access to the differential for maintenance, repair, etc. Further, the axle housing 205 and differential cover 203 may be designed so as to maintain a reservoir of oil in the vicinity of the differential 210, allowing for splash lubrication of components housed therein. The oil may be delivered to the axle housing 205 from the gearbox housing 209 (e.g., via an oil circuit similar to the oil circuit 120 of FIG. 1), which may also have a reservoir of oil collected in a bottom portion thereof.

The gearbox housing 209 may include a shaft and gearing arrangement housed therein for providing power to the differential 210 disposed within the axle housing 205. As such, the gearbox housing 209 may be fixedly mounted to the axle housing by any suitable attachment mechanism (e.g., bolts, brackets, welds, and/or combinations thereof) in a region adjacent to the differential 210, generally indicated as 250. Further, the electric machine housing 207 may be coupled to the axle housing 205, at a second location generally indicated as 252, by similar or other suitable mounting apparatuses. Other mounting arrangements have been envisioned, such as, for instance, where the electric machine housing 207 is not mounted to the axle housing 205 but rather suspended from the gearbox housing 209 in a cantilevered fashion. Such an arrangement, however, may provide less structural support to the electric machine.

The electric machine 206 and the gearbox 208 may thus be integrated with the axle assembly 204, in some examples, in an e-axle. Further, the axle housing 205, the electric machine housing 207, and the gearbox housing 209 may each be made of a metal (e.g., aluminum, steel, combinations thereof, and the like) which may be the same or a different metal for each housing. Drive system components as well as various oil and coolant passages, bearings, seals, and other flow restricting elements arranged with these components will now be described with reference to FIGS. 3-4F.

FIG. 3 shows a cross-sectional view of the electric drive system 202 and axle assembly 204 shown in FIG. 2, as defined by a lateral cut taken along dashed line 3-3. FIGS. 4A-4F depict other cross-sectional views of the electric machine 206 and the gearbox 208, as well as the interface therebetween and oil passages formed therein in the electric drive system 200. The cross-sectional views depicted in FIGS. 4A-4F may be defined by a cut plane that is parallel to the z-x plane in the axis system 150.

FIG. 3 illustrates a portion of the electric drive system 200, including the electric machine 206 and gearbox 208, and a portion of the axle assembly 204. The electric machine 206 may include a stator 300 and a rotor 302 enclosed in a working chamber 301 of the electric machine housing 207.

The electric drive system 202 may further include an oil circuit 303 and a coolant circuit 305 that cool and/or lubricate electric machine and/or gearbox components, which may share similarities with the oil circuit 120 and the coolant circuit 130, respectively, depicted in FIG. 1. The housing 207 includes a water jacket 304 formed therein with coolant channels 306, which is included in the coolant circuit 305. The coolant channels 306 may receive coolant from upstream components in the coolant circuit 305, via an inlet formed in the housing 207, as previously discussed with regard to the coolant circuit 130 of FIG. 1. The coolant circulating through the water jacket 304 may function to remove heat from the stator, rotor, and bearings of the electric machine 206.

The rotor 302 is designed to electromagnetically interact with the stator 300 to provide torque to a gearbox shaft 308 (e.g., a gearbox input shaft) via a rotor shaft 310. The rotor shaft 310 may be supported for rotation in the housing 207 by bearings positioned at outboard and inboard ends thereof. In the frame of reference depicted in FIG. 3, the inboard and outboard ends of the rotor shaft are the right and left ends. In particular, a front rotor shaft bearing 312 is shown disposed on the rotor shaft 310 near the outboard end thereof proximal to the gearbox 208. In some examples, the rotor shaft bearing 312 may be a radial bearing, such as a spherical ball bearing. More generally, the rotor shaft bearing 312 may include an inner race 319, an outer race 321, and rolling elements 323 (e.g., rollers or spherical balls), as shown in FIG. 4A. The inner race 319 of the bearing 312 is in contact with the rotor shaft 310 and the outer race 321 may be in contact with the electric machine housing 207.

FIG. 6 shows a rotor shaft bearing 600 which serves as an example of the rotor shaft bearing 312, shown in FIGS. 3A-4F. As such, the bearings 600 and 312 may have similar functional and structural features. The bearing 600 includes an outer race 602, rolling elements 604 (e.g., spherical balls), and an inner race 606. In some examples, the rolling elements 604 may be further guided for movement between the inner race 606 and the outer race 602 by a carrier 608. However, in other examples, the carrier 608 may be omitted from the bearing to increase oil flow therethrough. In these configurations, by providing a generally open bearing, the lifespan of the bearing may be increased, and the temperature of the bearing may be decreased in comparison to less open bearings. Further, voids 610 formed between the rolling elements 604, and between the inner race 606, the outer race 602, and/or the carrier 608 may allow for an adequate flow of oil through the bearing. To expound, the bearing 600 may not include shields and/or seals which would obstruct a flow of oil through the bearing. In this way, the oil flowrate through the bearing may be increased when compared to shielded and/or sealed bearings. The bearing 600 may therefore be cooled and lubricated to a greater extent while flushing out a larger amount of contaminants than sealed and shielded bearings. The inner race 606 may include an inner surface 619 that contacts an outer surface of the rotor shaft. The outer race 602 may include an outer surface 621 that may contact the motor housing.

Returning to FIG. 3, the gearbox shaft 308 may be supported for rotation in the gearbox housing 209 by a gearbox shaft bearing 309. As such, the bearing 309 is positioned on the gearbox shaft 308. In some cases, the bearing 309 may have a different configuration than the rotor shaft bearing 312. For instance, the bearing 309 may be a thrust bearing, such as a tapered roller bearing. Thus, the design of the bearings 309 and 312 may be tailored to withstand the expected loading in the system, thereby increasing the system's longevity. The bearing 309 generally includes an inner race 325, an outer race 327, and rolling elements 329 (e.g., tapered rollers), as shown in FIG. 4A. As such, the inner race 325 is in contact with the gearbox shaft 308 and the outer race 327 may be in contact with the gearbox housing 209.

In one example, as illustrated in FIG. 3, the housing 207 of the electric machine 106 may be coupled to the gearbox housing 209 of the gearbox 208 by way of bolts 211. For instance, an inboard side 213 of the gearbox may be coupled to the motor housing. Further, the gearbox shaft 308 may be coupled for rotation with the rotor shaft 310, such that a shaft interface 314 is formed therebetween within the gearbox housing 209. Specifically, the shaft interface 314 is formed between an outboard end 315 of the rotor shaft 310 and an inboard end 317 of the gearbox shaft 308. In the frame of reference illustrated in FIG. 3, the inboard end of the gearbox shaft is the right end of the shaft and the outboard end is the left end of the shaft.

In some examples, the shaft interface 314 may be a splined interface. In such an example, each of the rotor shaft 310 and the gearbox shaft 308 may have a plurality of splines that extend axially along a portion thereof, at the outboard end 315 and the inboard end 317, respectively. Specifically, in one example, the rotor shaft 310 may have splines disposed on an exterior surface 331 at a portion of the outboard end 315 thereof. The outboard end of the rotor shaft is the rotor shaft's left end in the frame of reference illustrated in FIG. 3. The gearbox shaft 308 may have splines on an interior surface 333 along a portion of the inboard end 317 thereof. The splines on the gearbox and rotor shafts axially extend along a length of the corresponding shaft. Further, the splined shaft interface 314 includes oil passages that axially extend therethrough and route oil from the gearbox housing towards the rotor shaft bearing 312, as will be elaborated on herein particularly with reference to FIGS. 4A-5. Designing the splined shaft interface in the manner allows the splines to serve a dual-use (i.e., functioning to rotationally connect the shafts and route oil to targeted components). Additionally, the rotor shaft 310 and the gearbox shaft 308 are coaxially disposed and therefore have a common rotational axis 316.

In some examples, a housing seal 318 may be disposed between the electric machine housing 207 and the gearbox housing 209. More specifically, the housing seal 318 may be disposed at a housing interface 320 (between the electric motor housing 207 and the gearbox housing 209) in the vicinity of the splined shaft interface 314. Further, the housing seal 318 may form a portion of a boundary of a sealed cavity 322. Oil may be introduced into the sealed cavity 322 through oil passages in the shaft interface 314 and from the sealed cavity oil flows to the front rotor shaft bearing 312. Other boundaries of the sealed cavity 322 may include a portion of an interior surface 335 of the gearbox housing 209 and a portion of an interior surface 337 of the electric machine housing 207, a portion of an outer surface 339 of the gearbox shaft 308, and/or a portion of an outer surface 341 of the rotor shaft 310, as illustrated in FIG. 4A. In one example, the sealed cavity 322 may be bounded by a rotor shaft seal 324 positioned on an inboard side of the rotor shaft bearing 312. Again, details of the sealed cavity and oil flow therethrough to the front rotor shaft bearing for cooling and lubrication thereof are expanded upon with reference to FIGS. 4A-5.

Returning to FIG. 3, the gearbox shaft 308 may have a gear 328 formed thereon outboard of the bearing 309, proximate an outboard end 355 of the gearbox shaft. A bearing 345 may be coupled to the outboard end 355 of the gearbox shaft 308. To elaborate, the bearing 345 may include an outer race that contacts the gearbox housing 209 and an inner race that is disposed around the gearbox shaft 308. Further, in some examples, a cover 357 may be coupled to the side 215 of the gearbox housing 209 at a position corresponding to the outboard end 355 of the gearbox shaft 308, such that an oil chamber 359 is formed between the cover 357 and the outboard end of the gearbox shaft. In some cases, this oil chamber 359 may receive and at least partially retain oil for subsequent routing through the gearbox housing and components, as will be elaborated on herein with reference to FIGS. 4E and 8.

As depicted in FIG. 3, the gear 328 may be in meshing engagement with a first gear 330 which is disposed on a shaft 332 (e.g., a gearbox output shaft), so that rotational power from the rotor shaft 310 may be transferred to the gearbox shaft 308 and then to the shaft 332 by way of the meshing gears 328, 330. The shaft 332 may be supported within the gearbox housing 209 by a pair of bearings 334 (e.g., roller bearings, such as cylindrical or spherical roller bearings) positioned on opposing axial ends of the shaft. Further, the shaft 332 may have a rotational axis 336 which is parallel to, and offset from, the common rotational axis 316 of the rotor shaft and gearbox shaft. However, other gearbox configurations have been contemplated. For instance, the shaft 332 may be omitted from the gearbox and power may be transferred directly from the shaft 308 to the differential 210.

The shaft 332 may have a second gear 338 formed thereon in meshing engagement with an input gear 340 of the differential 210. Thus, rotational power received at the shaft 332 may be transferred to the input gear 340 of the differential 210 via the second gear 338, whereby rotational power may be distributed to the axle shafts 216, 218 of the axle assembly 204 and eventually to drive wheels (e.g., the wheels 112, 114 of FIG. 1), in some examples. To elaborate, the input gear 340 may be coupled to a differential case 342 (e.g., via bolts 344), such that rotation of the input gear 340 causes the case to rotate. Further, a gearing arrangement within the differential case 342 distributes the rotational power to side gears 346, 348 which are coupled (e.g., in a splined or press-fit engagement) to the axle shafts 216, 218, respectively. The axle shafts 216, 218 and the differential 210 may be at least partially enclosed within the axle housing 205, with the differential 210 being at least partially covered by the differential cover 203 coupled to the axle housing 205. Further, the input gear 340 and the differential case 342 may be supported within the axle housing 205 and/or the gearbox housing 209 by bearings 350 and 352, respectively, in some examples. The bearings 350, 352 may be thrust bearings, in one example, such as tapered roller bearings, for instance. Further, the axle shafts 216, 218 and the differential 210 may share a rotational axis 356 which is parallel with, and offset from, both of the rotational axes 316, 336.

As previously discussed, the gearbox housing 209 may be attached to the axle housing 205, in proximity to the differential 210, as generally indicated at location 250. The attachment may include bolts 358 that couple a bracket to the housing 209 and a wall of the axle housing 205, though other attachment arrangements have been envisioned. Further, the electric machine housing 207 may also be coupled to the axle housing 205 at a location 252, different from location 250. In one example, location 250 may be proximate an inboard side 219 of the electric machine housing 207, opposite the outboard side 217 of the electric machine housing. Further, a bracket 360 on the housing 207 may be joined to a bracket 362 on the axle housing 205 via bolts 364, though other suitable fastening arrangements have been contemplated.

FIG. 4A illustrates a portion of the electric drive system 202. Specifically, the housing interface 320, between the joined electric machine housing 207 and the gearbox housing 209 is shown. Additionally, the splined shaft interface 314 formed between the outboard end 315 of the rotor shaft 310 and the inboard end 317 of the gearbox shaft 308 is further depicted. The housing seal 318, which may be an O-ring seal, in some examples, may be positioned at the housing interface 320 between a portion of the gearbox housing 209 and the electric machine housing 207. This may form the sealed cavity 322 radially inward of the housing seal 318 in the vicinity of the shaft interface 314. The sealed cavity 322 has oil therein and therefore may be referred to as an oil cavity.

Further, the splined shaft interface 314 includes multiple oil passages 400 that may be adjacent to splines which are formed on the interior of the gearbox shaft 308 and the exterior of the rotor shaft 310. An exemplary configuration of the splined shaft interface 314 and oil passages 400 formed therein is illustrated in FIG. 5, which depicts an axial cross-sectional view of the splined shaft interface 314, taken along a cut plane perpendicular to the rotational axis 316, as indicated by dashed line 5-5 in FIG. 4A.

FIG. 5 specifically depicts the splined shaft interface 314 between the interior surface 333 of the gearbox shaft 308 and the exterior surface 331 of the rotor shaft 310. More specifically, the interior surface 333 of the gearbox shaft 308 may include interior splines 508. Further, the exterior surface 331 of the rotor shaft 310 may include exterior splines 510. The interior and exterior splines 508 and 510, respectively, may be correspondingly sized and shaped so as to mate with one another, such that each of the exterior splines 510 may fit in a groove formed between two adjacent interior splines 508. The interior and exterior splines may also extend axially along a length of the respective gearbox shaft and rotor shaft to form the splined shaft interface 314.

Further, in one example, the splines may be contoured such that the splined shaft interface 314 includes an outer clearance 509 and/or an inner clearance 511. To elaborate, the outer clearance 509 may be formed between the tip of an exterior splines 510 and the base of a groove between the two interior splines 508 adjacent the exterior splines. Similarly, the inner clearance 511 may be formed between the tip of an interior splines 508 and the base of a groove between the two exterior splines 510 adjacent the interior splines. Thus, the clearances 509, 511 may form the oil passages 400 extending axially along the length of the splined shaft interface 314. Further, a clearance size may be selected so as to allow a flow of oil through the oil passages for cooling and/or lubrication. As will be elaborated on herein, other oil routing configurations may be implemented, in addition or as an alternative to the splined interface oil passages 400, in other examples for cooling and lubricating components.

In some examples, the splines 508, 510 may each have straight sides which may, in some cases, form a tapered tooth configuration. In other cases, however, the straight sides of the splines may be parallel to one another, extending radially outward so as to form a parallel key spline configuration. Further, in other examples, the splines may have an involute profile, which may reduce stress concentrations at the splined shaft interface 314, thereby increasing the strength of the coupling formed between the rotor shaft and the gearbox shaft. In one example, the teeth and grooves may be formed symmetrically about the entire splined shaft interface. However, other non-symmetrical arrangements have been contemplated, such as, for instance, where splines are disposed about a portion of the shaft interface, and another portion of the interface may be smooth.

Returning to FIG. 4A, having described potential examples of the oil passages 400 illustrated therein, the oil passages 400 may receive oil from an oil reservoir (e.g., a sump) in the gearbox housing 209. For instance, in order to receive the oil, the gearbox shaft 308 may include one or more oil inlet passages 408 formed therethrough. The inlet passages 408 may specifically extend from an exterior surface 410 of the gearbox shaft 308. Further, the inlet passages 408 may open to a chamber 414 which is formed between the outboard end 315 of the rotor shaft 310 and the interior surface 412 of the gearbox shaft.

The chamber 414 may be in fluidic communication with the oil passages 400, such that oil received in the chamber 414 via the inlet passages 408 may be routed through the oil passages 400 towards the inboard end 317 of the gearbox shaft 308. Further, the oil passages 400 may open to the cavity 322 at the inboard end 317 of the gearbox shaft 308 (e.g., at an inboard end of the splined shaft interface 314). The housing seal 318 at the housing interface 320 may reduce the chance of the oil received in the cavity 322 leaking from the gearbox housing 207, thus maintaining oil within the cavity 322. In the cavity 322, oil may flow along the outer surface of the rotor shaft 310. Thus, the oil may directly surround a portion of the exterior surface of the rotor shaft between the splined interface and the rotor bearing 312. Specifically, oil may flow along outer surfaces of the gearbox shaft 308 and/or the rotor shaft 310 in the region between the bearing 309 and the bearing 312. In other words, the region between the bearings 309 and 312 along the outer surface of the gearbox shaft 308 and the rotor shaft 310 may not have a seal. In this way, oil may travel unencumbered along the shafts toward the rotor shaft bearing, efficiently delivering a desired amount of oil to the rotor shaft bearing 312.

Additionally, oil may flow from the chamber 414 through the oil passages 400 and into the cavity 322. From the cavity 322, the oil may be routed towards the rotor shaft bearing 312. As such, in some examples, the shaft interface 314 may not include radial shaft seals (e.g., lip seals) for maintaining oil or grease in the interface, so that the flow of oil is not restricted through the oil passages 400 of the shaft interface 314. Thus, greasing of the shaft interface during manufacturing may be foregone to permit oil to more easily flow through the interface. In one example, the oil is restricted from entering the working chamber 301 of the electric machine housing 207 by the rotor shaft seal 324 positioned on an inboard side 415 of the rotor shaft bearing 312 spaced away from the cavity 322. However, in order to allow the flow of oil through the rotor shaft bearing 312, for cooling and lubrication thereof, a shaft seal may not be included on the rotor shaft on an outboard side 417 of the bearing 312 (e.g., between the bearing and the cavity 322) so that oil may flow from the cavity 322 to the bearing 312. Exemplary oil flow paths will be further described in FIGS. 4B-4F.

The electric machine housing 207 and/or gearbox housing 209 may include one or more oil return passages 416 through which oil may return to an oil reservoir formed within the gearbox housing 209. For example, once oil has been routed to and through the rotor shaft bearing 312, the oil may be routed through the oil return passage(s) 416 back to an oil reservoir in the gearbox, for example. In this way, the oil may effectively cool and lubricate the bearing 312, and flush out contaminants built up therein, before returning to the oil reservoir where it may be picked up by a pump, filtered, and recirculated back into the gearbox housing 209 and, via oil inlet passages 408, into the chamber 414, for instance.

FIG. 4B illustrates a first exemplary oil flow path 450, as indicated by arrows. The oil flow path 450, as well as any other oil flow path discussed herein, may generally be designed to cool and lubricate the front rotor shaft bearing 312 as well as other drive system components. However, in practice, the oil flow paths may have greater complexity than is captured by the arrows. The oil flow path 450 may initially travel into the chamber 414 via the oil inlet passages 408 in the gearbox shaft 308. In some examples, the oil flow may be a pressurized oil flow, as effected by a pump in the oil circuit 303. From the chamber 414, the oil may flow into the axially extending oil passages 400 through the splined shaft interface 314 into the cavity 322, as indicated by arrows. From the cavity 322, the oil may flow between the rotor shaft 310 and the electric machine housing 207 to the rotor shaft bearing 312. The oil flow path may then be blocked, upon flowing through the bearing 312, by the rotor shaft seal 324, and may then return, by way of oil return passage(s) 416, to an oil reservoir in the gearbox housing 209. In some examples, the gearbox shaft bearing 309 may be lubricated via oil flow from the cavity 322. In this way, the longevity of the bearing 312 and/or the bearing 309 is increased. As such, oil from the gearbox housing may be efficiently routed to each of the bearings 309 and 312, and also through the splined shaft interface 314, for lubrication and cooling thereof.

In particular, when the electric machine housing 207 includes the water jacket 304, the rotor shaft bearing 312 may be subject to a high thermal gradient due to the inner race 319 receiving thermal inputs from the gearbox and the outer race 321 being cooled by the water jacket arrangement. Thus, oil cooling of the rotor shaft bearing 312 in this manner may help to reduce the thermal stress on the bearing and increase its lifespan. By extending the lifespan of the rotor shaft bearing, the longevity of the electric drive system is correspondingly increased. Further, the housing seal 318 and the rotor shaft seal 324 may provide a space efficient arrangement for achieving the aforementioned oil routing scheme and blocking oil flow into the working chamber 301 of the electric machine housing 207. Even further, the extended longevity of the rotor shaft bearing afforded by the oil routing arrangements described herein may allow the rotor shaft bearing to be sized to support gear loads and reduce the overall number of bearings in the system, if wanted. Further, the rotor shaft bearing may be a higher speed bearing, in some cases, which may be effectively cooled and lubricated by the oil routing arrangement described herein to reduce the bearing degradation.

The electric drive system 200 may include another bearing coupled to the rotor shaft 310 on an opposite side of the shaft as the bearing 312. As such, the system may include four or more bearings that share a common rotational axis (i.e., rotational axis 316), in one embodiment. In such an embodiment, the system may be hyperstatic which decreases the chance of bearing degradation. In alternate embodiments however, the number of bearings in the system may be reduced. For instance, the system may include three or fewer bearings to decrease the size, complexity, and, in some cases, manufacturing cost, of the system, if desired. To reduce the number of bearings, portions of the motor may be incorporated into the axle.

Figure 4C:
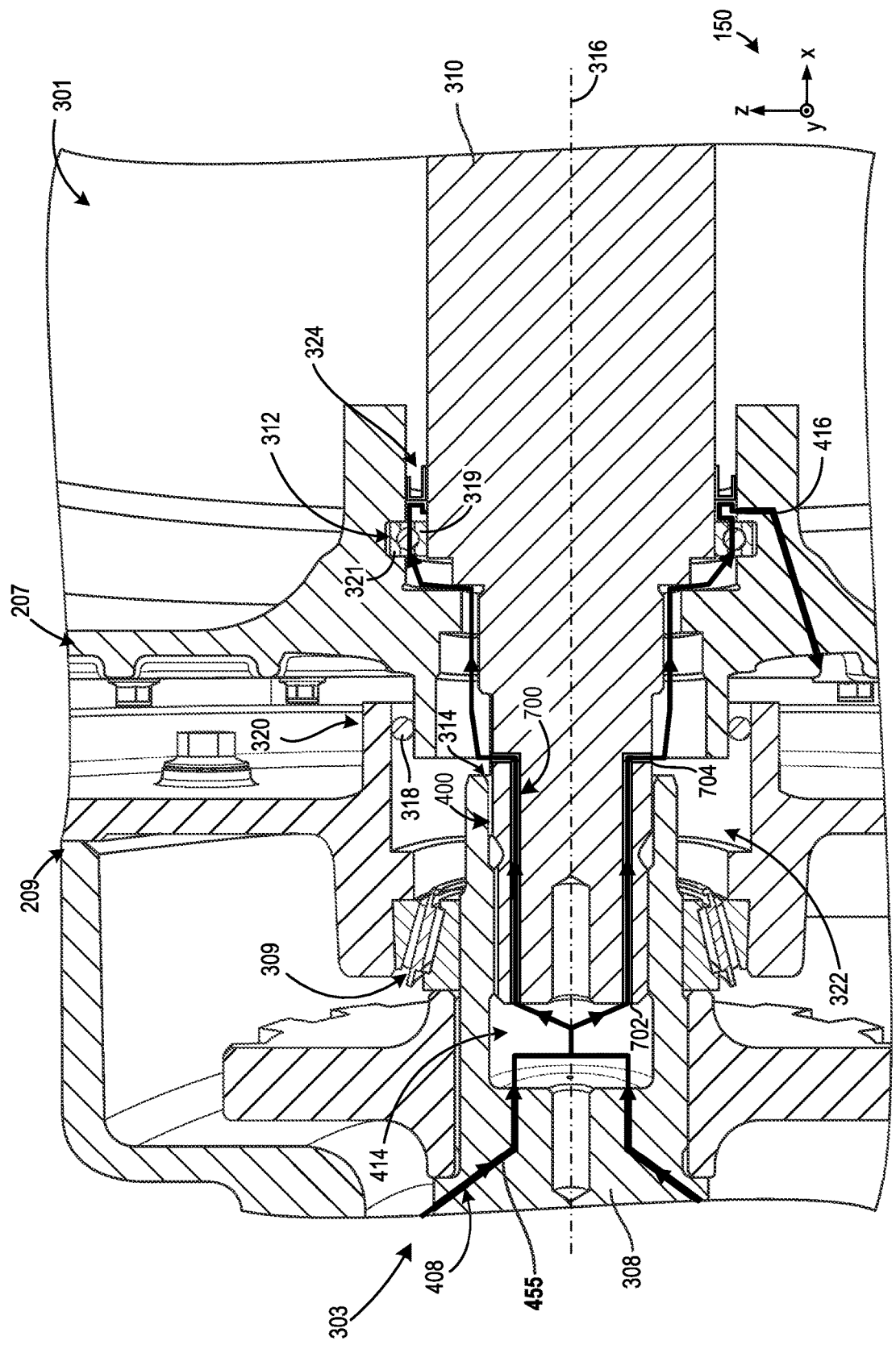

FIG. 4C illustrates another example oil flow path 455, as indicated by arrows, for cooling and lubricating the front rotor shaft bearing 312. In this example, the oil flow paths 455, depicted in FIG. 4C, the rotor shaft 310 may include oil passages 700 extending through a portion thereof, as illustrated in greater detail in FIGS. 7A-7B. The oil passages 700 include axial portions radially inward from the exterior splines 510. For instance, the oil passages 700 may extend from an opening 702 on the outboard end 315 of the rotor shaft (e.g., in a direction parallel to rotational axis 316) to a corresponding radial opening 704. The radial openings 704 may extend to respective locations on the outer surface of the rotor shaft so as to be in fluidic communication with the cavity 322 (e.g., at locations inboard of the exterior spline 510), as illustrated in FIG. 4C, in some examples.

The oil flow path 455 may initiate in a manner similar to the flow path 450 shown in FIG. 4B, whereby the oil flow path initially flows into the chamber 414 via the oil inlet passages 408 in the gearbox shaft 308. In some cases, however, the oil flow path 455 (and/or 450) may utilize other oil inlet configurations for supplying oil into the chamber 414. From the chamber 414, the oil may flow into the rotor shaft oil passages 700, via the openings 702, and then into the cavity 322 via the openings 704. From there, oil may flow through the bearing 312 to the rotor shaft seal 324 and then return to the oil reservoir by way of oil return passage(s) 416, as previously described. It will be understood that, in some cases, the oil passages 700 through the rotor shaft 310 may be included in addition to the oil passages 400 formed through the splined interface 314, rather than as an alternative to, in some examples, thereby enabling an even greater oil flow into the cavity 322 for cooling and lubricating the rotor shaft bearing 312.

Figure 4D:
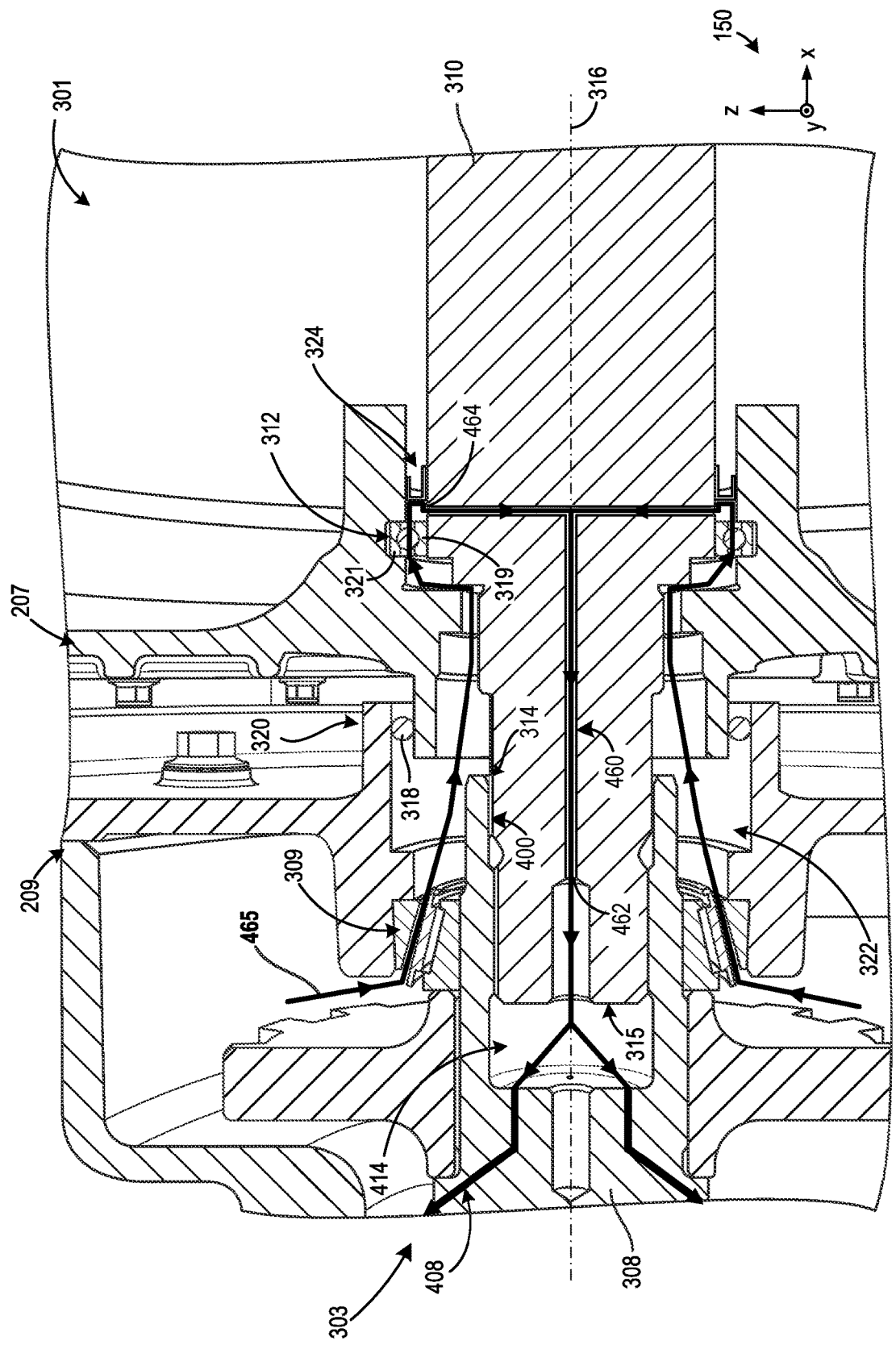
Figure 4E:
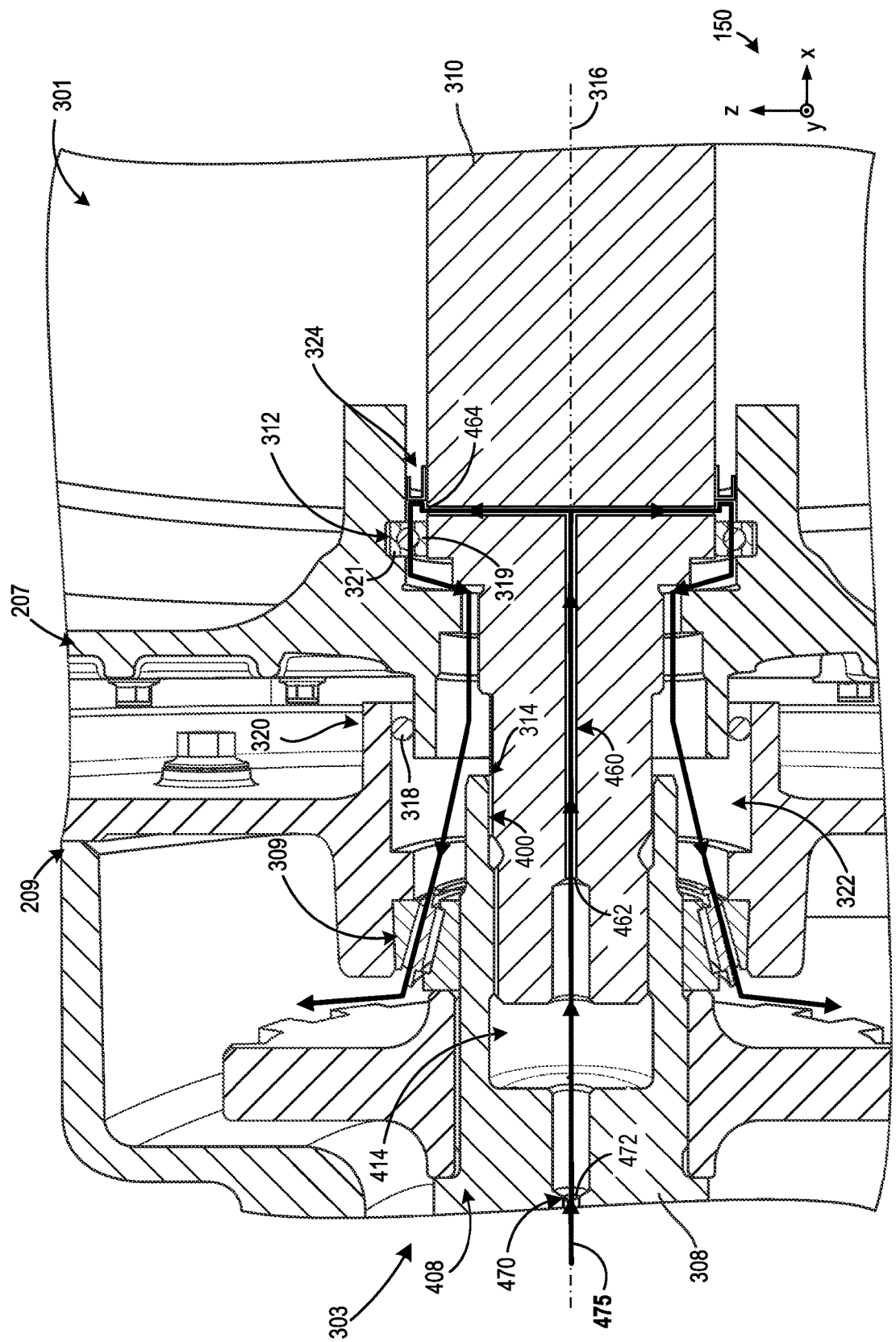
Figure 4F:
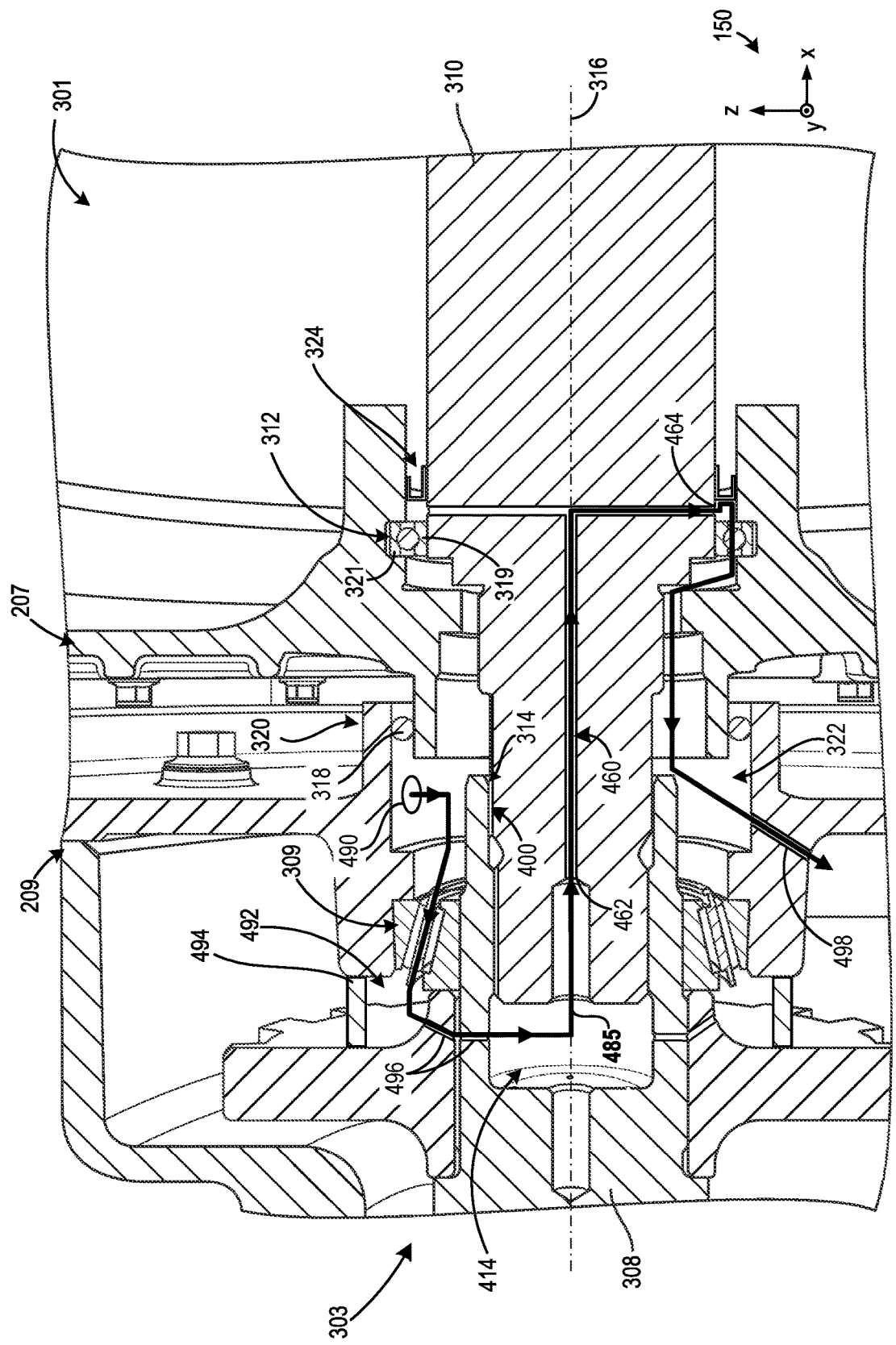

FIGS. 4D-4F show alternate oil flow path examples that may be implemented in the electric drive system 200. In these particular examples, the rotor shaft 310 may include a central oil passage 460 extending from an opening 462 at the outboard end 315 of the rotor shaft to a plurality of radial openings 464 on the exterior of the rotor shaft at a location between the rotor shaft bearing 312 and the rotor shaft seal 324. To elaborate, a portion of the oil passage 460 aligned with the opening 462 may have an axis coinciding with the rotational axis 316. Although not illustrated in the specific flow paths of FIGS. 4D-4F, it will be understood that any of these oil flow configurations may include one or both of the oil passages 400 and 700 of FIGS. 4B and 4C, respectively, in some examples.

Turning to FIG. 4D, an example oil flow path 465 is illustrated by arrows. From the gearbox housing 209, via pump induced pressure and/or lubrication splash, oil flows through the gearbox shaft bearing 309 into the cavity 322. From the cavity 322, the oil may be routed to and through the bearing 312 towards the rotor shaft seal 324. The oil flow path may then enter the central oil passage 460 via the openings 464 in the rotor shaft 310. Then, the oil enters the chamber 414 from the central oil passage 460 via the opening 462. In some examples, the oil inlet passages 408 may be configured as outlet passages, such that in the oil flow path 465, oil may flow from the chamber 414 back into the oil reservoir of the gearbox. In other examples, however, other oil return arrangements for returning oil from the chamber 414 and, more generally, from the bearing 312, to the oil reservoir have been contemplated, with regard to any of the examples described herein.

FIG. 4E shows an example oil flow path 475, as illustrated by arrows. The oil flow path 475 may initially flow into the chamber 414 by way of a central oil passage 470 in the gearbox shaft 308. In one example, the oil passage 470 may extend axially through the gearbox shaft 308 (e.g., along the rotational axis 316) from an outboard end thereof (e.g. the outboard end 355 shown in FIG. 3) to an opening 472 which is in fluidic communication with the chamber 414. As such, oil may flow from the oil chamber 359 shown in FIG. 3 into the central oil passage 470, partially illustrated in FIG. 4E. The oil flow path may then enter the central oil passage 460 in the rotor shaft 310 via the opening 462, next flowing through the radial openings 464 toward the bearing 312 and the rotor shaft seal 324. Next, the oil may flow through the bearing 312 into the cavity 322, and may then exit the cavity 322 and return to the oil reservoir by way of the gearbox shaft bearing 309.

In some cases, it may be desired to pressurize the oil flowing into the chamber 414 and/or to pressurize the oil flowing from the oil chamber 359 formed at the outboard end 355 of the gearbox shaft 308) into the gearbox central oil passage 470. For instance, in one example, turning briefly to FIG. 8, where the gearbox housing 209 is shown from the side 215 thereof, the gearbox housing 209 may include a raised section 800 at an upper portion 802. The raised section 800 may form a high-volume "slide" in which the oil may be efficiently routed towards a lower portion 804 of the gearbox housing, as indicated by dashed arrow 810. More specifically, the oil may flow towards the cover 357 at the side 215 of the gearbox housing 209. Thus, the raised section 800 may cause a higher volume of oil to be routed into the oil chamber 359 shown in FIG. 3 between the cover 357 and the outboard end 355 of the gearbox shaft 308. In this way, a pressurized flow of oil may be routed through the gearbox shaft 308 in an oil flow path (e.g., through the central oil passage 470 shown in oil flow path 475 of FIG. 4E), in some examples.

FIG. 4F illustrates yet another exemplary oil flow path 485, as indicated by arrows. The oil flow path 485 may initially travel into the cavity 322 by way of one or more oil inlet holes 490. In some examples, the oil inlet hole 490 may be gravity fed, routing oil into the cavity 322 (e.g., from reservoirs and/or passages in fluidic communication with the oil inlet hole 490) at least partially due to gravitational forces acting on the oil. From the cavity 322, oil may flow through the bearing 309 into a manifold 492 formed between the gearbox shaft 308 and a flow restricting body 494 positioned radially outward from the bearing 309. The body 494 may therefore cause the oil pressure within the manifold 492 to increase, forcing the oil through oil passages 496 into the chamber 414. As such, it will be understood that the oil passages 496 may extend at least through the gearbox shaft 308 and to the chamber 414, such that the manifold 492 and the chamber 414 are in fluidic communication. From the chamber 414, oil may flow into the central oil passage 460 in the rotor shaft 310, as previously described, and may then be routed to the rotor shaft seal 324 and through the bearing 312.

The oil flow path 485 may then return to the cavity 322, in some examples. Further, a second gravity fed oil hole 498 may be provided at another location within the cavity 322. In one example, the second gravity fed oil hole 498 may be smaller than the oil inlet hole 490, and may provide pressure relief within the cavity 322.

The exemplary oil paths depicted in FIGS. 4B-4F illustrate a variety of arrangements for routing oil for cooling and lubrication of a rotor shaft bearing. It should be noted that while some examples of oil passages may have been shown and/or discussed separate features or configurations, various combinations including one or more of aspects of the aforementioned arrangements have been envisioned in combination with one another to provide the desired oil flow path, not limited to the specific examples described herein.

The electric drive system described herein provides an efficient architecture for routing oil through a shaft interface between a rotor shaft and a gearbox shaft to cool and lubricate a front rotor shaft bearing disposed within an electric machine housing. The oil passages formed through the shaft interface provide an efficient design for cooling and lubricating multiple drive system components while reducing the likelihood an undesirably high thermal gradient at the rotor shaft bearing, thus increasing the lifespan of the bearing as well as entire electric drive system.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, an electric drive system is provided that comprises an electric machine including a housing that is connected to a gearbox housing; and a rotor shaft forming a shaft interface with a gearbox shaft at an outboard end thereof; a rotor shaft bearing disposed on the rotor shaft within the electric machine housing inboard of the shaft interface; a rotor shaft seal disposed within the electric machine housing and positioned on an inboard side of the rotor shaft bearing; and a plurality of oil passages in fluidic communication with an oil reservoir, extending through the rotor shaft, and in fluidic communication with the rotor shaft bearing.

In another aspect, an electric axle is provided that comprises a sealed cavity defined between an electric motor housing and a gearbox housing; a splined shaft interface formed between an outboard end of a rotor shaft and an inboard end of a gearbox shaft; a rotor shaft bearing disposed on the rotor shaft within the electric motor housing inboard of the splined shaft interface; a rotor shaft seal positioned on the rotor shaft inboard of the rotor shaft bearing; and a plurality of oil passages extending axially through the rotor shaft and in fluidic communication with an oil reservoir, wherein the plurality of oil passages and the rotor shaft bearing are in fluidic communication with the sealed cavity.

In any of the aspects or combinations of aspects, the electric drive system may further comprise a cavity positioned radially inward from a housing interface formed between the electric machine housing and the gearbox housing, wherein the housing interface is positioned axially between the shaft interface and the rotor shaft bearing.

In any of the aspects or combinations of aspects, the plurality of oil passages may open into a chamber arranged between an interior surface of the gearbox shaft and the outboard end of the rotor shaft.

In any of the aspects or combinations of aspects, the plurality of oil passages may extend axially through the shaft interface adjacent to a plurality of splines that form the shaft interface.

In any of the aspects or combinations of aspects, the electric drive system may further comprise one or more inlet passages extending through the gearbox shaft to the chamber.

In any of the aspects or combinations of aspects, the electric drive system may further comprise a housing seal disposed between the gearbox housing and the electric machine housing, wherein the cavity is formed in a space radially inward from the housing seal, and wherein the cavity receives oil from the plurality of oil passages and flows oil to an outboard side of the bearing.

In any of the aspects or combinations of aspects, the housing of the electric machine may include a water jacket through which coolant circulates; and the coolant may be fluidly separated from the oil.

In any of the aspects or combinations of aspects, the rotor shaft may not include a lip seal in a region between the shaft interface and the rotor shaft bearing.

In any of the aspects or combinations of aspects, the electric drive system may further comprise a gearbox shaft bearing disposed on the gearbox shaft, wherein the gearbox shaft bearing has a different configuration than the rotor shaft bearing.

In any of the aspects or combinations of aspects, the electric axle may further comprise an O-ring disposed between an outboard end of the electric motor housing and an inboard end of the gearbox housing, wherein the O-ring and the rotor shaft seal define boundaries of the sealed cavity.

In any of the aspects or combinations of aspects, the rotor shaft bearing may be in fluidic communication with the oil reservoir via the plurality of axially extending oil passages and one or more oil return passages formed in the gearbox housing and opening to the sealed cavity.

In any of the aspects or combinations of aspects, the one or more oil inlet passages may extend through the gearbox shaft and open to a chamber formed between an interior of the gearbox shaft and the outboard end of the rotor shaft, wherein the chamber is in fluidic communication with the plurality of oil passages.

In any of the aspects or combinations of aspects, the one or more oil inlet passages in the gearbox shaft may direct oil from the gearbox housing into the chamber, whereby oil is routed into the plurality of oil passages.

In any of the aspects or combinations of aspects, the electric axle may further comprise a gearbox shaft bearing disposed on the gearbox shaft, wherein the rotor shaft bearing is in fluidic communication with the splined shaft interface and the gearbox shaft bearing.

In any of the aspects or combinations of aspects, the gearbox shaft bearing may be a thrust bearing and the rotor shaft bearing may be a radial bearing.

In any of the aspects or combinations of aspects, the rotor shaft may not include a shaft seal in a region between the gearbox shaft and the rotor shaft bearing, the gearbox shaft may not include a shaft seal at the inboard end thereof within the sealed cavity, and the splined shaft interface may not include a seal disposed between the gearbox shaft and the rotor shaft.

In any of the aspects or combinations of aspects, oil may flow through the plurality of oil passages and the sealed cavity to the rotor shaft bearing without interruption.

In any of the aspects or combinations of aspects, the one or more oil inlet passages may extend from an exterior surface of the gearbox shaft to an interior space defined within the inboard end of the gearbox shaft.

In any of the aspects or combinations of aspects, the rotor shaft seal may fluidly separate the sealed cavity from a working compartment of the electric motor housing, wherein the electric motor housing may include coolant passages formed therein for circulating a coolant therethrough, wherein the coolant is fluidly separated from the oil.

In any of the aspects or combinations of aspects, the rotor shaft may include an oil cavity circumferentially surrounding its outer surface from the shaft interface to the rotor shaft bearing.

In any of the aspects or combinations of the aspects, oil may directly surround the rotor shaft in a region between an inboard end of the gearbox shaft and the rotor shaft bearing.

In another representation, an electric axle assembly is provided that includes an electric motor rotor shaft bearing that is positioned outboard of a rotor shaft seal and receives oil from an oil enclosure that extends between an outboard side of the rotor shaft bearing and wherein the oil enclosure receives oil from one or more oil conduits that extend through a splined interface that is formed between a rotor shaft of the electric motor and a gearbox input shaft.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle comprising:
a sealed cavity defined between an electric motor housing and a gearbox housing;
a rotor shaft including a plurality of rotor shaft splines that mate with a plurality of gearbox shaft splines that are included in a gearbox shaft;
a rotor shaft bearing disposed on the rotor shaft within the electric motor housing inboard of the plurality of rotor shaft splines and the plurality of gearbox shaft splines;
a rotor shaft seal positioned on the rotor shaft inboard of the rotor shaft bearing; and
a plurality of oil passages extending axially through the rotor shaft and/or along a surface of the rotor shaft and in fluidic communication with an oil reservoir;
wherein the plurality of oil passages and the rotor shaft bearing are in fluidic communication with the sealed cavity.

2. The electric axle of claim 1, further comprising an O-ring disposed between an outboard end of the electric motor housing and an inboard end of the gearbox housing, wherein the O-ring and the rotor shaft seal define boundaries of the sealed cavity.

3. The electric axle of claim 1, wherein the rotor shaft bearing is in fluidic communication with the oil reservoir via the plurality of oil passages and one or more oil return passages formed in the gearbox housing and opening to the sealed cavity.

4. The electric axle of claim 1, further comprising a gearbox shaft bearing disposed on the gearbox shaft, wherein the rotor shaft bearing is in fluidic communication with the plurality of oil passages and the gearbox shaft bearing.

5. The electric axle of claim 4, wherein the gearbox shaft bearing is a thrust bearing and the rotor shaft bearing is a radial bearing.

6. The electric axle of claim 1, wherein oil directly surrounds the rotor shaft in a region between an inboard end of the gearbox shaft and the rotor shaft bearing.

7. The electric axle of claim 1, wherein oil flows through the plurality of oil passages and the sealed cavity to the rotor shaft bearing without interruption.

8. The electric axle of claim 1, wherein:
the rotor shaft seal fluidly separates the sealed cavity from a working compartment of the electric motor housing;
the electric motor housing includes coolant passages formed therein for circulating a coolant therethrough; and
the coolant is fluidly separated from the oil.

9. The electric axle of claim 1, wherein the rotor shaft includes an oil cavity circumferentially surrounding its outer surface and bounded by the rotor shaft bearing.

10. The electric axle of claim 1, wherein the plurality of oil passages open into a chamber arranged between an interior surface of the gearbox shaft and the outboard end of the rotor shaft.

11. The electric axle of claim 1, further comprising one or more inlet passages extending through the gearbox shaft and opening into to the chamber.

12. The electric axle of claim 1, wherein the plurality of oil passages extend axially through the mated plurality of a plurality of rotor shaft splines and the plurality of gearbox shaft splines.

13. An electric axle comprising:
a sealed cavity defined between an electric motor housing and a gearbox housing;

a rotor shaft including a plurality of rotor shaft splines that mate with a plurality of gearbox shaft splines that are included in a gearbox shaft;

a rotor shaft bearing disposed on the rotor shaft within the electric motor housing inboard of the plurality of rotor shaft splines and the plurality of gearbox shaft splines;

a rotor shaft seal positioned on the rotor shaft inboard of the rotor shaft bearing; and a plurality of oil passages extending axially through the rotor shaft and/or along a surface of the rotor shaft and in fluidic communication with an oil reservoir;

wherein the plurality of oil passages and the rotor shaft bearing are in fluidic communication with the sealed cavity;

wherein one or more oil inlet passages extend through the gearbox shaft and open to a chamber formed between an interior of the gearbox shaft and an outboard end of the rotor shaft; and wherein the chamber is in fluidic communication with the plurality of oil passages.

14. The electric axle of claim 13, wherein the one or more oil inlet passages in the gearbox shaft direct oil from the gearbox housing into the chamber, whereby oil is routed into the plurality of oil passages.

15. An electric axle comprising:

a sealed cavity defined between an electric motor housing and a gearbox housing;

a rotor shaft including a plurality of rotor shaft splines that mate with a plurality of gearbox shaft splines that are included in a gearbox shaft;

a rotor shaft bearing disposed on the rotor shaft within the electric motor housing inboard of the plurality of rotor shaft splines and the plurality of gearbox shaft splines;

a rotor shaft seal positioned on the rotor shaft inboard of the rotor shaft bearing; and a plurality of oil passages extending axially through the rotor shaft and/or along a surface of the rotor shaft and in fluidic communication with an oil reservoir;

wherein the plurality of oil passages and the rotor shaft bearing are in fluidic communication with the sealed cavity;

wherein oil sequentially flows through the plurality of oil passages and the sealed cavity to the rotor shaft bearing without interruption; and wherein one or more oil inlet passages extend from an exterior surface of the gearbox shaft to an interior space defined within and inboard end of a gearbox.

* * * * *